US006437014B1

(12) United States Patent
Ho et al.

(10) Patent No.: US 6,437,014 B1
(45) Date of Patent: Aug. 20, 2002

(54) METHOD OF MAKING ELASTIC ARTICLES HAVING IMPROVED HEAT-RESISTANCE

(75) Inventors: Thoi H. Ho, Lake Jackson; Selim Bensason, Houston; Rajen M. Patel, Lake Jackson; Kimberly S. Houchens, Seabrook; Rona L. Reid, Houston; Pak-Wing S. Chum, Lake Jackson; Leonie K. Walsh, Houston, all of TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/627,534

(22) Filed: Jul. 28, 2000

Related U.S. Application Data

(60) Provisional application No. 60/203,558, filed on May 11, 2000.

(51) Int. Cl.[7] .............................. C08K 5/13; C08K 5/16; C08K 3/32; C08J 3/28; C08F 297/00
(52) U.S. Cl. .............................. 522/75; 522/78; 522/79; 522/112; 522/157; 522/158; 522/159; 522/160; 522/161; 522/153; 522/154; 522/76
(58) Field of Search .............................. 522/75, 78, 111, 522/112, 157, 158, 160, 161, 150, 79, 76, 159, 153, 154

(56) References Cited

U.S. PATENT DOCUMENTS

| | | |
|---|---|---|
| 3,936,365 A | 2/1976 | Saunders et al. |
| 4,957,790 A | 9/1990 | Warren |
| 5,122,593 A | 6/1992 | Jennings et al. |
| 5,200,443 A | 4/1993 | Hudson |
| 5,283,101 A | 2/1994 | Li |
| 5,324,576 A | 6/1994 | Reed et al. |
| 5,472,775 A | 12/1995 | Obijeski et al. |
| 5,525,257 A | 6/1996 | Kleinstünk et al. |

FOREIGN PATENT DOCUMENTS

| | | |
|---|---|---|
| WO | 92/19993 | 11/1992 |
| WO | 94/25647 | 11/1994 |
| WO | 95/06151 | 3/1995 |
| WO | 95/29197 | 11/1995 |
| WO | 95/33006 | 12/1995 |
| WO | 98/20065 | 5/1998 |
| WO | 99/60060 | 11/1999 |
| WO | 99/63021 | 12/1999 |

OTHER PUBLICATIONS

Brochure by Ciba–Geigy, "Chimassorb™ 944FL: Hindered Amine Light Stabilizer Use and Handling" (1996).
Brochure by Ciba–Geigy, "Stabilization of Adhesives and Their Components" (1994).
Iring, et al., "The effect of the processing steps in the oxidative stability of polyethylene tubing crosslinked by irradiation", Die Angewandte Makromolekulare Chemie, vol. 247, pp. 225–238 (1997).
Woods, et al., "Controlled cross–linking of high modulus polyethylene fibre", Plastics, Rubber and Composites Processing and Applications, vol. 18, No. 4, pp. 255–261 (1992).

*Primary Examiner*—Susan W. Berman

(57) ABSTRACT

The present invention relates to a method for making a heat-resistant elastic article and a heat-resistant elastic article. The invention especially relates to a method of making elastic fibers and polymeric elastic fibers wherein the elastic fibers are capable of withstanding dyeing and heat-setting processes that typically are conducted at elevated temperatures (such as 110–230° C. and especially at greater than or equal to 130° C. for minutes). The inventive method comprises radiation crosslinking an article (or plurality of articles) under an inert or oxygen limited atmosphere (for example, in $N_2$, argon, helium, carbon dioxide, xenon and/or a vacuum) wherein the article (or articles) comprises at least one amine stabilizer and preferably another optional stabilizer additive. More preferably, the radiation crosslinking is performed at a low temperature (−50 to 40° C.). The elastic article (or articles) comprises a homogeneously branched ethylene interpolymer (preferably a substantially linear ethylene interpolymer), a substantially hydrogenated block polymer, or a combination of the two. The heat-resistant elastic articles (especially fibers) are useful in various durable or repeated-use fabric applications such as, but not limited to, clothing, under-garments, and sports apparel. The heat-resistant elastic fibers can be conveniently formed into fabrics using well-known techniques such as, for example, by using co-knitting techniques with cotton, nylon, and/or polyester fibers.

3 Claims, No Drawings

METHOD OF MAKING ELASTIC ARTICLES HAVING IMPROVED HEAT-RESISTANCE

CROSS-REFERENCE TO RELATED APPLICATIONS

This application claims the priority benefit of provisional application No. 60/203558, field May 11, 2000, the disclosure of which is incorporated herein by reference in its entirety.

FIELD OF THE INVENTION

The present invention relates to a method for making a heat-resistant elastic article and a heat-resistant elastic article. The invention especially relates to a method of making elastic fibers and polymeric elastic fibers wherein the elastic fibers are capable of withstanding dyeing and heat-setting processes that typically are conducted at elevated temperatures (such as 110–230° C. and especially at greater than or equal to 130° C. for minutes). The inventive method comprises radiation crosslinking an article (or plurality of articles) under an inert or oxygen limited atmosphere (for example, in $N_2$, argon, helium, carbon dioxide, xenon and/or a vacuum) wherein the article (or articles) comprises at least one amine stabilizer and preferably another optional stabilizer additive. More preferably, the radiation crosslinking is performed at a low temperature (−50 to 40° C.). The elastic article (or articles) comprises a homogeneously branched ethylene interpolymer (preferably a substantially linear ethylene interpolymer), a substantially hydrogenated block polymer, or a combination of the two. The heat-resistant elastic articles (especially fibers) are useful in various durable or repeated-use fabric applications such as, but not limited to, clothing, under-garments, and sports apparel. The heat-resistant elastic fibers can be conveniently formed into fabrics using well-known techniques such as, for example, by using co-knitting techniques with cotton, nylon, and/or polyester fibers.

BACKGROUND OF THE INVENTION

Disposable articles are typically elastic composite materials prepared from a combination of polymer film, fibers, sheets and absorbent materials as well as a combination of fabrication technologies. Whereas the fibers are prepared by well known processes such as spun bonding, melt blowing, melt spinning and continuous filament wounding techniques, the film and sheet forming processes typically involve known extrusion and coextrusion techniques, for example, blown film, cast film, profile extrusion, injection molding, extrusion coating, and extrusion sheeting.

A material is typically characterized as elastic where it has a high percent elastic recovery (that is, a low percent permanent set) after application of a biasing force. Ideally, elastic materials are characterized by a combination of three important properties, that is, a low percent permanent set, a low stress or load at strain, and a low percent stress or load relaxation. That is, there should be (1) a low stress or load requirement to stretch the material, (2) no or low relaxing of the stress or unloading once the material is stretched, and (3) complete or high recovery to original dimensions after the stretching, biasing or straining is discontinued.

To be used in the durable fabrics, the fibers making up the fabric have to be, inter alia, stable during dyeing and heat setting processes. We found that the polyolefinic fibers that were irradiated in air tended to fuse together when subjected to the high temperatures typical of dyeing processes (about 120° C. for 30 min). Conversely, we surprisingly and unexpectedly found that when irradiated under an inert atmosphere, resultant crosslinked fibers were highly stable during the dyeing process (that is, the fibers did not melt or fuse together). The addition of a mixture of hindered phenol and hindered amine stabilizers further stabilized the fibers at heat setting condition (200–210° C.).

Block polymers generally are elastomeric materials that exhibit excellent solid-state elastic performance attributes. But unsaturated block polymers such as, for example, styrene-butadiene-styrene triblock polymers, tend to exhibit mediocre thermal stability, especially in the molten state and poor UV stability.

Conversely, known partially hydrogenated (or partially saturated) styrene block copolymers (for example, KRATON G block copolymers supplied by Shell Chemical Company) are difficult to melt process and draw into fibers or films. In fact, preparation of fine denier fiber (that is, less than or equal to 40 denier) or thin film (that is, less than or equal to 2 mils) from partially hydrogenated or partially saturated block polymers is generally not possible at commercial fabrication rates. To overcome characteristic melt processing and drawing difficulties, partially hydrogenated block copolymers are commonly formulated with various additives such as oils, waxes and tackifiers. But in order to achieve good melt processability and drawability, very high levels of low molecular weight additives are typically required which tend to compromise strength and elastic properties.

Lycra™ (trademark of Dupont Chemical Company), a segmented polyurethane elastic material, is currently used in various durable fabrics. But a shortcoming of Lycra is that it is not stable at typical high heat setting temperatures for PET fiber (200–210° C.). Similar to ordinary uncrosslinked polyolefin-based elastic materials, Lycra articles tend to lose their integrity and shape and elastic properties when subjected to elevated service temperatures. As such, Lycra can not be successful used in co-knitting applications with high temperature fibers such as polyester fibers. Another major shortcoming of Lycra is its cost. That is, Lycra tends to be extremely cost prohibitive for many of applications.

WO 99/63021, the disclosure of which is incorporated herein by reference, describes elastic articles comprised of a substantially cured, irradiated, or crosslinked (or curable, irradiated or crosslinkable) homogeneously branched ethylene interpolymer characterized as having a density less than 0.90 $g/cm^3$ and containing at least one nitrogen-containing stabilizer. The described elastic articles are disclosed as suitable for use in applications where good elasticity must be maintained at elevated temperatures and after laundering such as, for example, elastic waist bands of undergarments and other clothing. WO 99/63021 alsogenerally teaches that the nitrogen-containing stabilizer can be used in combination with phenolic and phosphite stabilizers and reported examples therein are known to include a combination of amine, phenol and phosphorus-containing stabilizers. But there is no description of crosslinking or irradiation under an inert or reduced oxygen atmosphere and there is no specific teaching of improved heat-setting and high temperature dyeing performance.

U.S. Pat. No. 5,324,576, the disclosure of which is incorporated herein by reference, discloses an elastic nonwoven web of microfibers of radiation crosslinked ethylene/alpha olefin copolymers, wherein a substantially linear ethylene polymer (that is, INSITE technology polymer XUR-1567-48562-9D from The Dow Chemical Company) is set forth in the reported inventive example. The substantially linear ethylene polymer is subjected to electron beam radiation in a nitrogen inerted chamber at an oxygen level of approximately 5 ppm. While the substantially linear ethylene polymer is known to contain 500 ppm of a phenolic antioxidant, there is no teaching to add a nitrogen-containing stabilizer to the polymer. Moreover, there is no disclosure regarding the elastic performance of the radiated substantially linear ethylene polymer at elevated temperatures.

Chemical abstract N1993:235832 (D. W. Woods and I. M. Ward, *Plast., Rubber Comps. Process. Appl.* (1992), 18(4), 255–61), the disclosure of which is incorporated herein by reference, describes the use of radiation under nitrogen to crosslink HDPE fiber to improve creep resistance.

WO 99/60060, the disclosure of which is incorporated herein by reference, discloses heat resistant elastic fiber comprised of polyolefinic elastomers made using single site catalyst.

Elastic materials such as films, strips, coating, ribbons and sheet comprising at least one substantially linear ethylene polymer are disclosed in U.S. Pat. No. 5,472,775 to Obijeski et al., the disclosure of which is incorporated herein by reference. But Obijeski et al. do not disclose the performance of their elastic materials at elevated temperatures (that is, at temperatures above room temperature).

WO 94/25647, the disclosure of which is incorporated herein by reference, discloses elastic fibers and fabrics made from homogeneously branched substantially linear ethylene polymers. The fibers are said to posses at least 50 percent recovery (that is, less than or equal 50 percent permanent set) at 100 percent strain. However, there is no disclosure in WO 94/25647 regarding the elasticity of these fibers at elevated temperatures or the effects of laundering on these fibers.

WO 95/29197, the disclosure of which is incorporated herein by reference, discloses curable, silane-grafted substantially ethylene polymers which are useful in wire and cable coatings, weather-stripping, and fibers. In the Examples, inventive samples include fibers comprising silane-grafted substantially ethylene polymers having densities of 0.868 g/cm$^3$ and 0.870 g/cm$^3$. The inventive examples are shown to exhibit improved elastic recovery at elevated temperatures.

U.S. Pat. No. 5,525,257 to Kurtz et al., the disclosure of which is incorporated herein by reference, discloses that low levels of irradiation of less than 2 megarads of Ziegler catalyzed linear low density ethylene polymer results in improved stretchability and bubble stability without measurable gelation. Kurtz et al. do not provide any disclosure regarding elasticity at elevated temperatures.

U.S. Pat. No. 4,957,790 to Warren, the disclosure of which is incorporated herein by reference, discloses the use of pro-rad compounds and irradiation to prepare heat-shrinkable linear low density polyethylene films having an increased orientation rate during fabrication. In the examples provided therein, Warren employs Ziegler catalyzed ethylene polymers having densities greater than or equal to 0.905 g/cm$^3$.

Various compounds are disclosed in the art and/or sold commercially as high temperature stabilizers and antioxidants. However, the criteria employed to distinguish these compounds as stabilizers and antioxidants typically relates to their ability to resistance yellowing, crosslinking and/or the ill-effects of irradiation (for example, gamma irradiation for purposes of sterilization).

In other instances, different types of stabilizers are equated to one another or are said to perform comparably. For example, it is known that hindered phenolic stabilizers (for example, lrganox® 1010 supplied by Ciba-Geigy) can be as effective as hindered amine stabilizers (for example, Chimassorb® 944 supplied by Ciba-Geigy), and vice versa. In a product brochure entitled, "Chimassorb 944FL: Hindered Amine Light Stabilizer Use and Handling", printed 1996, Ciba-Geigy states Chimassorb 944 "gives long-term heat stability to polyolefins by a radical trapping mechanism similar to that of hindered phenols."

Further, there is some belief that there is no universally effective stabilizer for polymers as the definition for stability inevitably varies with each application. In particular, there is no effective stabilizer for washable, high temperature serviceable polyolefinic elastic materials.

In general, stabilizers are known to inhibit crosslinking. In regard to crosslinking generally, there are several disclosures relating to radiation resistant (for example, gamma and electron beam) polymer compositions comprising amine stabilizers. Such disclosures typically teach relatively high levels of amine stabilizer (for example, greater than or equal to 0.34 weight percent) are required where inhibition of crosslinking, discoloration and other undesirable irradiation effects are desired. Another examples include stabilized disposal nonwoven fabrics (see, for example, U.S. Pat. No. 5,200,443, the disclosure of which is incorporated herein by reference) and stabilized molding materials (for example, syringes). Gamma sterilization resistant fibers, including amine coatings and the use of hybrid phenolic/amine stabilizers are also known. See, for example, U.S. Pat. No. 5,122,593 to Jennings et al., the disclosure of which is incorporated herein by reference.

Stabilized polyethylene compositions with improved resistance to oxidation and improved radiation efficiency are also known. M. Iring et al. in "The Effect of the Processing Steps on the Oxidative Stability of Polyethylene Tubing Crosslinked by Irradiation", *Die Angew. Makromol. Chemie*, Vol. 247, pp. 225–238 (1997), the disclosure of which is incorporated herein by reference, teach that amine stabilizers are more effective towards inhibiting electron-beam irradiation effects (that is, provide better resistance against oxidation) than hindered phenols.

WO 92/19993 and U.S. Pat. No. 5,283,101, the disclosures of which are incorporated herein by reference, discloses launderable retroreflective appliques comprised of a multicomponent binder composition consisting of an electron-beam curable elastomer, crosslinker(s), and coupling agent(s) and optional colorants, stabilizers, flame retardants and flow modifiers. The allegedly inventive appliques are said to be capable of withstanding ordinary household washing conditions as well as more stringent industrial washings without loss of retroreflectiveness. Illustrative examples of electron-beam curable elastomers of the binder are said to be "chlorosulfonated polyethylenes, ethylene copolymers comprising at least about 70 weight percent of polyethylene such as ethylene/vinyl acetate, ethylene/acrylate, and ethylene/acrylic acid, and poly(ethylene-co-propylene-co-diene) ("EPDM") polymers." Optional stabilizers are described to be "thermal stabilizers and antioxidants such as hindered phenols and light stabilizers such as hindered amines or ultraviolet stabilizers". Although there is an equating of the suitability or effectiveness of hindered phenols to hindered amines in the descriptions of WO 92/19993 and U.S. Pat. No. 5,283,101, no stabilizer of any kind is exemplified in the provided examples. Further, although the applique can employ polymers that are described as "highly flexible" before and after electron-beam curing, neither the selected polymers nor the applique itself are described as "elastic". While elastic materials typically have a high degree of flexibility (that is, Young's Modulus of less than 10,000 psi (68.9 MPa) where lower modulus means more flexibility), highly flexible materials can be nonelastic as the terms "nonelastic" and "elastic" are defined herein below. That is, not all "highly flexible" materials are elastic.

Although there is an abundance of art related to elastic materials comprising curable, radiated and/or crosslinked ethylene polymers, and there is also an abundance of art related to stabilized ethylene polymer compositions and articles, there is no known disclosure of a polyolefinic elastic material with effective additive stabilization wherein the stabilization does not inhibit the desirable effects of irradiation and/or crosslinking (that is, impart elevated temperature elasticity) and yet does inhibit the loss-of elastic integrity (that is, scission) when the material is subjected to processing or finishing steps at elevated temperatures.

Further, in a product brochure entitled, "Stabilization of Adhesives and Their Components", pp. 8–9 (1994), Ciba-Geigy, a premier stabilizer supplier, states that scission occurring in elastomeric materials(for example, styrene-isoprene-styrene block copolymers) at elevated temperatures above 70° C. is not readily controlled by the use of antioxidants.

As such, there is a present need for cost-effective, stable elastic articles having good elasticity at elevated temperatures as well as good heat setting characteristics. That is, there is a need for elastic articles which in-service retain their shapes under strain at elevated temperatures (for example, greater than or equal to 125° C.) and can be processed, finished and/or laundered at even higher temperatures and still retain their in-service elastic characteristics. There is also a need for a method of making elastic articles having good elasticity at elevated temperatures as well as good dyeing and heat setting characteristics. We have discovered that these and other objects can be completely met by the invention herein described.

SUMMARY OF THE INVENTION

We surprisingly discovered that the combination of radiation under an inert atmosphere or oxygen-reduced atmosphere (that is, less than 20 ppm, preferably less than 10 ppm, more preferably less than 5 ppm oxygen) and the use of an amine stabilizer such as a hindered amine or aromatic amine (and optionally a hindered phenol and/or a phosphorus-containing stabilizer) can provide elastic materials (especially fibers) that maintain their elasticity, yet are sufficiently crosslinked to confer sufficient heat resistance to permit high temperature dyeing and heat setting. The broad aspect of the invention is a method of making an elastic article having improved heat resistance (that is, a heat-resistant elastic article) comprising the steps of:

(a) providing at least one elastic polymer or elastic polymer composition (for example, a homogeneously branched ethylene interpolymer having a density of less than or equal to 0.90 g/cm$^3$ at 23° C. or a substantially hydrogenated block copolymer) which contains at least one amine or nitrogen-containing stabilizer therein, (b) fabricating, forming or shaping the polymer or polymer composition into an article, and (c) during or after the fabrication, forming or shaping, subjecting the article to ionizing radiation while the article is in or under an inert or oxygen-reduced atmosphere.

Preferably, the irradiation or crosslinking is effectuated using ionizing radiation, most preferably by using electron beam irradiation. Also, preferably, the article (for example, but not limited to, the extrudate, filament, web, film or part) is permitted to cool or is quenched to ambient temperature (that is, permitted to substantially solidify) after fabrication or formation before the application of ionizing radiation to effectuate irradiation or crosslinking. Most preferably, the irradiation is conducted at a low temperature.

An important benefit of the inventive fibers is now elastic fibers can be used in combination with fibers which require heat setting at elevated temperatures such as, for example, that PET fibers.

DETAILED DESCRIPTION OF THE INVENTION

The term "heat resistant" as used herein refers to the ability of an elastic polymer or elastic polymer composition in the form of fiber to pass the high temperature heat setting and dyeing tests described herein.

The term "elastic article" is used in reference to shaped items, while the term "elastic material" is a general reference to polymer, polymer blends, polymer compositions, articles, parts or items.

The term "elastic" or "elastic-like behavior" as used herein refers to any material (for example, bands, ribbons, strips, tapes, profile, moldings, sheets, coatings, films, threads, filament, fibers, fibrous webs, fabrics and the like as well as laminates or composites including the same) having a permanent set less than or equal to 80 percent, especially less than or equal to 60 percent, more especially less than or equal to 50 percent and most especially less than or equal 25 percent (that is, most especially greater than or equal to 87.5 percent recovery) at 200 percent strain and at a temperature between its glass transition temperature and its crystalline melting point or range is stretchable to a stretched, biased length at least 200 percent greater than its relaxed, unstretched length. The extent that a material does not return to its original dimensions after being stretched is its percent permanent set.

Elastic polymeric materials and elastic polymer compositions are also referred to in the art as "elastomers" and "elastomeric". Preferred elastic shaped articles are fibers and films, and especially preferred articles of the invention are fibers and fabrics containing the fibers.

The term "nonelastic or inelastic" as used herein means the material or article is not elastic as defined herein (that is, the material or article has a percent permanent set greater than 80 at 200 percent strain).

The term "meltblown" is used herein in the conventional sense to refer to fibers formed by extruding the molten elastic polymer or elastic polymer composition through a plurality of fine, usually circular, die capillaries as molten threads or filaments into converging high velocity gas streams (for example, air) which function to attenuate the threads or filaments to reduced diameters. Thereafter, the filaments or threads are carried by the high velocity gas streams and deposited on a collecting surface to form a web of randomly dispersed fibers with average diameters generally smaller than 10 microns.

The term "spunbond" is used herein in the conventional sense to refer to fibers formed by extruding the molten elastic polymer or elastic polymer composition as filaments through a plurality of fine, usually circular, die capillaries of a spinneret with the diameter of the extruded filaments then being rapidly reduced and thereafter depositing the filaments onto a collecting surface to form a web of randomly dispersed spunbond fibers with average diameters generally between about 7 and about 30 microns.

The term "nonwoven" as used herein and in the conventional sense means a web or fabric having a structure of individual fibers or threads which are randomly interlaid, but not in an identifiable manner as is the case for a knitted fabric. The elastic fiber of the present invention can be employed to prepare inventive nonwoven elastic fabrics as well as composite structures comprising the elastic nonwoven fabric in combination with nonelastic materials.

The term "conjugated" refers to fibers which have been formed from at least two polymers extruded from separate extruders but meltblown or spun together to form one fiber. Conjugated fibers are sometimes referred to in the art as multicomponent or bicomponent fibers. The polymers are usually different from each other although conjugated fibers may be monocomponent fibers. The polymers are arranged in substantially constantly positioned distinct zones across the cross-section of the conjugated fibers and extend continuously along the length of the conjugated fibers. The configuration of conjugated fibers can be, for example, a sheath/core arrangement (wherein one polymer is surrounded by another), a side by side arrangement, a pie arrangement or an "islands-in-the sea" arrangement. Conjugated fibers are described in U.S Pat. No. 5,108,820 to Kaneko et al.; U.S. Pat. No. 5,336,552 to Strack et al.; and U.S. Pat. No. 5,382,400 to Pike et al., the disclosures of all of which are incorporated herein by reference. The elastic fiber of the present invention can be in a conjugated configuration, for example, as a core or sheath, or both.

The term "thermal bonding" is used herein refers to the heating of fibers to effect the melting (or softening) and fusing of fibers such that a nonwoven fabric is produced. Thermal bonding includes calendar bonding and through-air bonding as well as methods known in the art.

The expression "thermal bondable at a reduced hot melt adhesive amount" refers to comparative peel test results using A to Findley Adhesive HX9275 (supplied by Ato Findley Nederlands B. V., Roosendaal, The Netherlands) or H. B. Fuller Adhesive D875BD1 (supplied by H. B. Fuller GmbH, I-Oneburg, Germany) and test procedures and methods described in WO 00/00229, the disclosure of which is incorporated herein by reference, wherein the same peel strength as the adhesive without deploying thermal bonding can be obtained even though the quantity of adhesive is at least 15 percent less where thermal bonding is deployed.

The term "polymer", as used herein, refers to a polymeric compound prepared by polymerizing one or more monomers. As used herein, generic term "polymer" embraces the terms "homopolymer," "copolymer," "terpolymer" as well as "interpolymer." A polymer is usually made in one reactor or polymerization vessel but can as well as be made using multiple reactors or polymerization vessels, although the latter is usually referred to as a polymer composition.

The term "polymer composition" as used herein refers to a mixture of a polymer and at least one ingredient added to or mixed with the polymer after the polymer is formed. Thus, the term "polymer composition" includes poly-blends (that is, admixtures of two or more polymers wherein each polymers is made in separate reactors or polymerization whether or not the reactors or vessels are part of the same polymerization system or not).

The term "interpolymer", as used herein refers to polymers prepared by the polymerization of at least two different types of monomers. As used herein the generic term "interpolymer" includes the term "copolymers" (which is usually employed to refer to polymers prepared from two different monomers) as well as the term "terpolymers" (which is usually employed to refer to polymers prepared from three different types of monomers).

The term "radiated" or "irradiated" as used herein means the elastic polymer or elastic polymer composition or the shaped article comprised of the elastic polymer or elastic polymer composition was subjected to at least 3 megarads (or the equivalent thereof) of radiation dosage whether or not there was a measurable decrease in percent xylene extractables (that is, increase in insoluble gel). That is, substantial crosslinking may not result from the irradiation.

The terms "crosslinked" and "substantially crosslinked" as used herein mean the elastic polymer or elastic polymer composition or the shaped article comprised of the elastic polymer or elastic polymer composition is characterized as having xylene extractables of less than or equal to 45 weight percent (that is, greater than or equal to 55 weight percent gel content), preferably less than or equal to 40 weight percent (that is, greater than or equal to 60 weight percent gel content), more preferably less than or equal to 35 weight percent (that is, greater than or equal to 65 weight percent gel content), where xylene extractables (and gel content) are determined in accordance with ASTM D-2765.

The terms "cured" and "substantially cured" as used herein means the elastic polymer or elastic polymer composition or the shaped article comprised of the elastic polymer or elastic polymer composition was subjected or exposed to a treatment which induced crosslinking. As used herein, the terms relate to the use of a grafted silane compound.

The terms "curable" and "crosslinkable" as used herein mean the elastic polymer or elastic polymer composition or the shaped article comprised of the elastic polymer or elastic polymer composition is not crosslinked and has not been subjected or exposed to treatment which induces crosslinking although the elastic polymer, elastic polymer composition or the shaped article comprised of the elastic polymer or elastic polymer composition comprises additive(s) or functionality that will effectuate crosslinking upon subjected or exposed to such treatment.

The term "pro-rad additive" as used herein means a compound which is not activated during normal fabrication or processing of the elastic polymer or elastic polymer composition, but can be activated by the application of temperatures (heat) substantially above normal fabrication or processing temperatures or ionizing energy (or both) (and especially with regard to article, part or item fabrication and processing) to effectuate some measurable gelation or preferably, substantial crosslinking.

In the practice of the present invention, curing, irradiation or crosslinking of the elastic polymers, elastic polymer compositions or articles comprising elastic polymers or elastic polymer compositions can be accomplished by any means known in the art, including, but not limited to, electron-beam irradiation, beta irradiation, X-rays, gamma irradiation, controlled thermal heating, corona irradiation, peroxides, allyl compounds and UV radiation with or without crosslinking catalyst. Electron-beam irradiation is the preferred technique for crosslinking the substantially hydrogenated block polymer or the shaped article comprised of the substantially hydrogenated block polymer. Preferably, the curing, irradiation, crosslinking or combination thereof provides a percent gel, as determined using xylene in accordance with ASTM D-2765, of greater than or equal to 40 weight percent, more preferably greater than or equal to 50 weight percent, most preferably greater than or equal to 70 weight percent.

Suitable electron-beam irradiation equipment is available from Energy Services, Inc. Wilmington, Mass. with capabilities of at least 100 kilo-electron volts (KeV) and at least 5 kilowatts (Kw). Preferably, electrons are employed up to 70 megarads dosages. The irradiation source can be any electron beam generator operating in a range of about 150 Kev to about 12 mega-electron volts (MeV) with a power output capable of supplying the desired dosage. The electron voltage can be adjusted to appropriate levels which may be, for example, 100,000, 300,000, 1,000,000 or 2,000,000 or 3,000,000 or 6,000,000 or higher or lower. Many other apparati for irradiating polymeric materials are known in the art.

In the present invention, effective irradiation is usually carried out at a dosage between about 3 megarads (Mrad) to about 35 megarads, preferably from about 10 to about 35 megarads, more preferably from about 15 to about 32 megarads, and most preferably from about 19 to about 28 megarads. Further, the irradiation can be conveniently carried out at room temperature. But preferably, irradiation is conducted while the article (or plurality of articles) is at lower temperatures throughout the exposure, such as, for example, at about −50° C. to about 40° C., especially at about −20° C. to about 30° C., more especially at about 0C to about 25° C., and most especially from about 0° C. to about 12° C.

The irradiation can be carried out on-line (that is, during fabrication of the article), off-line (such as after fabrication of the article, for example, film, by unwinding or wrapping the fabricated article) or on-spool (as such in the case of fibers, filaments and the like). Preferably, the irradiation is carried out after shaping or fabrication of the article. Also, in a preferred embodiment, a pro-rad additive is incorporated into the elastic polymer or elastic polymer composition and the polymer or composition is subsequently irradiated with electron beam radiation at about 8 to about 32 megarads.

In another aspect of the invention, the irradiation (preferably electron beam irradiation) is carried out under an inert or oxygen-limited atmosphere. Suitable atmospheres can be provided by the use of helium, argon, nitrogen, carbon dioxide, xenon and/or a vacuum. Substantial improvements in high temperature serviceability can be gained by using an inert or oxygen-limited atmosphere without any attendant substantial lost in elastic performance ordinarily associated with service or use at elevated temperatures.

Crosslinking can be promoted with a crosslinking catalyst, and any catalyst that will provide this function can be used. Suitable catalysts generally include organic bases, carboxylic acids, and organometallic compounds including organic titanates and complexes or carboxylates of lead, cobalt, iron, nickel, zinc and tin. Dibutyltindilaurate, dioctyltinmaleate, dibutyltindiacetate, dibutyltindioctoate, stannous acetate, stannous octoate, lead naphthenate, zinc caprylate, cobalt naphthenate; and the like. Tin carboxylate, especially dibutyltindilaurate and dioctyltinmaleate, are particularly effective for this invention. The catalyst (or mixture of catalysts) is present in a catalytic amount, typically between about 0.015 and about 0.035 phr.

Representative pro-rad additives include, but are not limited to, azo compounds, organic peroxides and polyfunctional vinyl or allyl compounds such as, for example, triallyl cyanurate, triallyl isocyanurate, pentaerthritol tetramethacrylate, glutaraldehyde, ethylene glycol dimethacrylate, diallyl maleate, dipropargyl maleate, dipropargyl monoallyl cyanurate, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, tert-butyl peracetate, azobis isobutyl nitrite and the like and combination thereof. Preferred pro-rad additives for use in the present invention are compounds which have poly-functional (that is, at least two) moieties such as C=C, C=N or C=O.

At least one pro-rad additive can be introduced to the ethylene interpolymer by any method known in the art. However, preferably the pro-rad additive(s) is introduced via a masterbatch concentrate comprising the same or different base resin as the ethylene interpolymer. Preferably, the pro-rad additive concentration for the masterbatch is relatively high for example, greater than or equal to 25 weight percent (based on the total weight of the concentrate).

The at least one pro-rad additive is introduced to the ethylene polymer in any effective amount. Preferably, the at least one pro-rad additive introduction amount is from about 0.001 to about 5 weight percent, more preferably from about 0.005 to about 2.5 weight percent and most preferably from about 0.015 to about 1 weight percent (based on the total weight of the substantially hydrogenated block polymer).

Amine or Nitrogen-Containing Stabilizer

Suitable amine or nitrogen-containing stabilizers for use in the present invention include, but are not limited to, naphthylamines (for example, N-phenyl naphthylamines such as Naugard PAN supplied by Uniroyal); diphenylamine and derivatives thereof which are also referred to as secondary aromatic amines (for example, 4, 4'-bis( , -dimethylbenzyl)-diphenylamine which is supplied by Uniroyal Chemical under the designation Naugard® 445); p-phenylenediamines (for example, Wingstay® 300 supplied by Goodyear); piperidines and derivatives thereof (for example, poly[[6-[(1,1,3,3-tetramethylbutyl)amino]-1,3,5-triazine-2, 4-diyl ][(2,2,6,6-tetramethyl-4-piperidinyl) imino]-1,6-hexanediyl[(2,2,6,6-tetramethyl-4-piperidinyl) imino]]) which is supplied by Ciba Specialty Chemicals under the designation of Chimassorb® 944 as well as other substituted piperidines such as Chimassorb® 119, Tinuvin® 622 and Tinuvine® 770, all three also supplied by Ciba Specialty Chemicals), and quinolines (for example, oxyquinolines and hydroquinolines such as polymeric 2,2, 4-trimethyl-1,2-dihydroquinoline which is supplied by Vanderbilt Company under the designation s Agerite® D).

Suitable amine or nitrogen-containing stabilizers also include the hybrid stabilizers such as aminophenols (for example, N, N'-hexamethylenebis-3-(3,5-ditert-butyl-4-hydroxyphenyl)-propionamide), acylaminophenols (which are also referred to as 4-hydroyanilides) and the various hybrid stabilizers described in U.S. Pat. No. 5,122,593 (the disclosure of which is incorporated herein by reference) which consist of a N-(substituted)-1-(piperazine-2-one alkyl) group at one end and a (3,5-dialkyl-4-hydroxyphenyl)-α,α-disubstituted acetamine at the other end.

Other suitable amine or nitrogen-containing stabilizers include carboxylic acid amides of aromatic mono and dicarboxylic acids and N-monosubstituted derivatives (e.g N,N'-diphenyloxamide and 2,2'-oxamidobisethyl 3-(3, 5-di-tert-butyl-4-hydroxyphenyl) propionate which is supplied by Uniroyal Chemical under the designation Naugard® XL-1); hydrazides of aliphatic and aromatic mono- and dicarboxylic acids and N-acylated derivatives thereof; bis-acylated hydrazine derivatives; melamine; benzotriazoles, hydrazones; acylated derivatives of hydrazino-triazines; polyhydrazides; salicylaethylenediimines; salicylaloximes; derivatives of ethylenediamino tetraacetic acid; and aminotriazoles and acylated derivatives thereof.

Preferred amine or nitrogen-containing stabilizers for use in the present invention are diphenylamines, substituted piperidines and hydroquinolines. The most preferred amine or nitrogen-containing stabilizers are hindered amines since they tend to cause less detrimental polymer discoloration than aromatic amines.

Further, the at least one amine or nitrogen-containing stabilizer can be employed alone or in combination with one or more other stabilizer such as, for example, but not limited to, other amine or nitrogen-containing stabilizer; a hindered phenol (for example, 2,6-di-tert-butyl-4-methylphenol which is supplied by Koppers Chemical under the designation BHT®; tetrakis(methylene 3-(3,5-di-tert-butyl-4-hydroxyphenyl) propionate) methane which is supplied by Ciba Specialty Chemicals under the designation Irganox® 1010; Irganox 1076 supplied by Ciba Specialty Chemicals; Cyanox 1790 which is tris (4-t-butyl-3-hydroxy-2,6-dimethylbenzyl)-s-triazine-2,4,6-(1H,3H,5H)-trione as supplied by Cytec; and Irganox 3114 which is 1,3,5-tris(3,5-di-tert-butyl-4-hydroxybenzyl)-1,3,5-triazinane-2,4,6-trione as supplied by Ciba Specialty Chemicals); a thioester (for example, dilauryl thiodipropionate which is supplied by Evans under the designation Evanstab® 12); a phosphite (for example, Irgafos® 168 supplied by Ciba Specialty Chemicals and tri(nonylphenyl) phosphite which is supplied by Uniroyal Chemical under the designation Naugard® P); diphosphite (for example, distearyl pentaerthritol diphosphite which is supplied by Borg-Warner under the designation Weston® 618); a polymeric phosphite (for example, Wytox® 345-S(1) supplied by Olin); phosphited phenol and bisphenol (for example, Wytox® 604 supplied by Olin); and diphosphonite (for example, tetrakis(2,4-di-tert-butylphenyl) 4,4'-biphenylylene diphosphonite which is supplied by Sandox under the designation Sandostab® P-EPQ). A preferred combination is a hindered amine and a hindered phenol. With regard to hindered phenols, Cyanox 1790 and Irganox 3114 preferred since these stabilizers tend to have a less detrimental effects on discoloration (due to nitroxide gas formation) than Irganox 1076 or Irganox 1010.

Preferably, the at least one amine or nitrogen-containing stabilizer (and optional other stabilizer) is added to the homogeneously branched ethylene polymer or the substantially hydrogenated block polymer or both in a melt compounding step, more preferably by the use of an additive concentrate, prior to fabrication and shaping process steps. The at least one nitrogen-containing stabilizer (and the optional other stabilizer) can be added to the interpolymer or block polymer at any effective concentration. But, preferably, the total stabilizer concentration is in the range of from about 0.02 to about 2 weight percent (based on the total weight of the stabilizer and interpolymer and/or block polymer), more preferably in the range from about 0.075 to about 1 weight percent (based on the total weight of the stabilizer and the interpolymer and/or block polymer) and most preferably in the range of from about 0.1 to about 0.32 weight percent (based on the total weight of the stabilizer and the interpolymer and/or block). Where an optional other stabilizer is used (for example, a hindered phenol), the concentration of the amine to the phenol is in the range from about 2:1 to about 1:2, preferably in the range of from about 1.25:1 to about 1:1.25.

An especially preferred embodiment is a combination of amine with a phenol and a phosphorus-containing stabilizer, more preferably where the total concentration of the phenol and a phosphorus-containing stabilizer is less than or equal to 0.15 weight percent and the amine or nitrogen-containing stabilizer concentration is in the range of 0.15 to 0.32 weight percent.

In-process additives, for example, calcium stearate, water, and fluoropolymers, may also be used for purposes such as for the deactivation of residual catalyst or improved processability or both. Colorants, coupling agents and fire retardants may also be include as longer as their incorporation does not disturb the desirable characteristics of the invention.

Suitable polymers for use in the present invention include ethylene-alpha olefin interpolymers, substantially hydrogenated block polymers, styrene butadiene styrene block polymers, styrene-ethylene/butene-styrene block polymers, ethylene styrene interpolymers, polypropylenes, polyamides, polyurethanes and any combination thereof. But preferred polymers are substantially hydrogenated block polymers and homogeneously branched ethylene-alpha olefin interpolymers.

Substantially Hydrogenated Block Polymer

The term "substantially hydrogenated block polymer" as used herein means a block copolymer that is characterized as having a hydrogenation level of greater than 90 percent (by number) for each vinyl aromatic monomer unit block and a hydrogenation level of greater than 95 percent (by number) for each conjugated diene polymer block, where for both the vinyl aromatic monomer and conjugated diene monomer repeating unit blocks, hydrogenation converts unsaturated moieties into saturated moieties.

The term "partially hydrogenated block polymer" as used herein means a block polymer that is hydrogenated but does not meet the hydrogenation levels that define a substantially hydrogenated block polymer.

Substantially hydrogenated block copolymers comprise at least one distinct block of a hydrogenated polymerized vinyl aromatic monomer and at least one block of a hydrogenated polymerized conjugated diene monomer. Preferred substantially hydrogenated block polymers are triblock comprising (before hydrogenation) two vinyl aromatic monomer unit blocks and one conjugated diene monomer unit block. Suitable substantially hydrogenated block polymers for use in the present invention are generally characterized by:

a) a weight ratio of conjugated diene monomer unit block to vinyl aromatic monomer unit block before hydrogenation of greater than 60:40 b) a weight average molecular weight ($M_w$) before hydrogenation of from about 30,000 to about 150,000 (preferably, especially for high drawdown application such as, for example, fiber spinning, less than or equal to 81,000), wherein each vinyl aromatic monomer unit block (A) has a weight average molecular weight, $Mw_a$, of from about 5,000 to about 45,000 and each conjugated diene monomer unit block (B) has a weight average molecular weight, $Mw_b$, of from about 12,000 to about 110,000; and c) a hydrogenation level such that each vinyl aromatic monomer unit block is hydrogenated to a level of greater than 90 percent and each conjugated diene monomer unit block is hydrogenated to a level of greater than 95 percent, as determined using UV-VIS spectrophotometry and proton NMR analysis.

Neat substantially hydrogenated block polymers can be further characterized as having a viscosity at 0.1 rad/sec and 190° C., as determined using a parallel plate rheometer (Rheometrics RMS-800 equipped with 25 mm diameter flat plates at 1.5 mm gap under a nitrogen purge), that is less than 1,000,000 poises, preferably less than or equal to 750,000 poises, more preferably less than 500,000 poises or that is at least 30 percent, preferably at least 50 percent, more preferably at least 80 lower than that of a partially hydrogenated block polymer having the same monomer types, number of monomer units, symmetry and weight average molecular weight, or that is defined by the following inequality:

$$Ln \text{ viscosity at } 0.1 \text{ rad/sec} \leq (7.08 \times 10^5)(M_w) + 7.89$$

where "Ln" means natural log and "≦" means less than or equal to.

Neat substantially hydrogenated block polymers can also be further characterized as having a drawability of less than or equal to 200 denier, preferably less than or equal to 175 denier, more preferably less than or equal to 50 denier when fiber spun at 0.43 g/minute and 250° C. using an Instron capillary rheometer equipped with a die having a 1,000 micron diameter and a 20:1 L/D. The term "neat" is used herein to mean unblended with other synthetic polymer.

The vinyl aromatic monomer is typically a monomer of the formula:

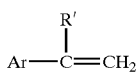

wherein R' is hydrogen or alkyl, Ar is phenyl, halophenyl, alkylphenyl, alkylhalophenyl, naphthyl, pyridinyl, or anthracenyl, wherein any alkyl group contains 1 to 6 carbon atoms which may be mono or multisubstituted with functional groups such as halo, nitro, amino, hydroxy, cyano, carbonyl and carboxyl. More preferably Ar is phenyl or alkyl phenyl with phenyl being most preferred. Typical vinyl aromatic monomers include styrene, alpha-methylstyrene, all isomers of vinyl toluene, especially para-vinyl toluene, all isomers of ethyl styrene, propyl styrene, butyl styrene, vinyl biphenyl, vinyl naphthalene, vinyl anthracene and mixtures thereof. The block copolymer can contain more than one specific polymerized vinyl aromatic monomer. In other words, the block copolymer can contain a polystyrene block and a poly-alpha-methylstyrene block. The hydrogenated vinyl aromatic block may also be a copolymer, wherein the hydrogenated vinyl aromatic portion is at least 50 weight percent of the copolymer.

The conjugated diene monomer can be any monomer having 2 conjugated double bonds. Such monomers include for example 1,3-butadiene, 2-methyl-1,3-butadiene, 2-methyl-1,3 pentadiene, isoprene and similar compounds, and mixtures thereof. The block copolymer can contain more than one specific polymerized conjugated diene monomer. In other words, the block copolymer can contain a polybutadiene block and a polyisoprene block.

The conjugated diene polymer block can comprise materials that remain amorphous after the hydrogenation process, or materials which are capable of crystallization after hydrogenation. Hydrogenated polyisoprene blocks remain .amorphous, while hydrogenated polybutadiene blocks can be either amorphous or crystallizable depending upon their structure. Polybutadiene can contain either a 1,2 configuration, which hydrogenates to give the equivalent of a 1-butene repeat unit, or a 1,4-configuration, which hydrogenates to give the equivalent of an ethylene repeat unit. Polybutadiene blocks having at least approximately 40 weight percent 1,2-butadiene content, based on the weight of the polybutadiene block, provides substantially amorphous blocks with low glass transition temperatures upon hydrogenation. Polybutadiene blocks having less than approximately 40 weight percent 1,2-butadiene content, based on the weight of the polybutadiene block, provide crystalline blocks upon hydrogenation. Depending on the final application of the polymer it may be desirable to incorporate a crystalline block (to improve solvent resistance) or an amorphous, more compliant block. In some applications, the block copolymer can contain more than one conjugated diene polymer block, such as a polybutadiene block and a polyisoprene block. The conjugated diene polymer block may also be a copolymer of a conjugated diene, wherein the conjugated diene portion of the copolymer is at least 50 weight percent of the copolymer. The conjugated diene polymer block may also be a copolymer of more than one conjugated diene, such as a copolymer of butadiene and isoprene. Also, other polymeric blocks may also be included in the substantially hydrogenated block polymers used in the present invention.

A "block" is herein defined as a polymeric segment of a copolymer that exhibits microphase separation from a structurally or compositionally different polymeric segment of the copolymer. Microphase separation occurs due to the incompatibility of the polymeric segments within the block copolymer. The separation of block segments can be detected by the presence of distinct glass transition temperatures. Microphase separation and block copolymers are generally discussed in "Block Copolymers-Designer Soft Materials", PHYSICS TODAY, February, 1999, pages 32–38, the disclosure of which is incorporated herein by reference.

Suitable substantially hydrogenated block polymers typically have a weight ratio of conjugated diene monomer unit block to vinyl aromatic monomer unit block before hydrogenation of from about 60:40 to about 95:5, preferably from about 65:35 to about 90:10, more preferably from about 70:30 to about 85:15, based on the total weight of the conjugated diene monomer unit and vinyl aromatic monomer unit blocks.

The total weights of the vinyl aromatic monomer unit block(s) and the conjugated diene monomer unit block(s) before hydrogenation is typically at least 80 weight percent, preferably at least 90, and more preferably at least 95 weight percent of the total weight of the hydrogenated block polymer. More specifically, the hydrogenated block polymer typically contains from 1 to 99 weight percent of a hydrogenated vinyl aromatic polymer (for example, polyvinylcyclohexane or PVCH block, generally from 10, preferably from 15, more preferably from 20, even more preferably from 25, and most preferably from 30 to 90 weight percent, preferably to 85 and most preferably to 80 percent, based on the total weight of the hydrogenated block polymer. And, as to the conjugated diene polymer block, the hydrogenated block copolymer typically contains from 1 to 99 weight percent of a hydrogenated conjugated diene polymer block, preferably from 10, more preferably from 15, and most preferably from 20 to 90 weight percent, typically to 85, preferably to 80, more preferably to 75, even more preferably to 70 and most preferably to 65 percent, based on the total weight of the copolymer.

The substantially hydrogenated block polymers suitable for use in the present invention are produced by the hydrogenation of block copolymers including triblock, multiblock, tapered block, and star block polymers such as, for example, but not limited to, SBS, SBSBS, SIS, SISIS, and SISBS (wherein S is polystyrene, B is polybutadiene and I is polyisoprene). Preferred block polymers contain at least one block segment comprised of a vinyl aromatic polymer block, more preferably the block polymer is symmetrical such as, for example, a triblock with a vinyl aromatic polymer block on each end. The block polymers may, however, contain any number of additional blocks, wherein these blocks may be attached at any point to the triblock polymer backbone. Thus, linear blocks would include, for example, SBS, SBSB, SBSBS, and SBSBSB. That is, suitable block polymers include asymmetrical block polymers and tapered linear block polymers.

The block polymer can also be branched, wherein polymer chains are attached at any point along the polymer backbone. In addition, blends of any of the aforementioned block copolymers can also be used as well as blends of the block copolymers with their hydrogenated homopolymer counterparts. In other words, a hydrogenated SBS block polymer can be blended with a hydrogenated SBSBS block polymer or a hydrogenated polystyrene homopolymer or both. It should be noted here that in the production of triblock polymers, small amounts of residual diblock copolymers are often produced.

The weight average molecular weight ($M_w$) of suitable substantially hydrogenated block polymers, as measured before hydrogenation, is generally from 30,000, preferably from 45,000, more preferably from 55,000 and most preferably from 60,000 to 150,000, typically to 140,000, generally to 135,000, preferably to 130,000, more preferably to 125,000, and most preferably to 120,000. But preferably, especially when used neat (that is, without being blended with other polymer) for fiber melt spinning purposes, the weight average molecular weight before hydrogenation will be less than or equal to 81,500, more preferably less than or equal to 75,000 and most preferably less than or equal to 67,500.

Substantially hydrogenated block polymers can have vinyl aromatic monomer unit block with weight average molecular weights, Mw, before hydrogenation of from about 6,000, especially from about 9,000, more especially from about 11,000, and most especially from about 12,000 to about 45,000, especially to about 35,000, more especially to about 25,000 and most especially to about 20,000. The weight average molecular weight of the conjugated diene monomer unit block before hydrogenation can be from about 12,000, especially from about 27,000, more especially from about 33,000 and most especially from about 36,000 to about 110,000, especially to about 100,000, more especially to about 90,000 and most especially to about 80,000. But preferably, especially when used neat for fiber melt spinning purposes, for triblocks comprising two hydrogenated vinyl aromatic monomer unit blocks and one hydrogenated conjugated diene monomer unit block, the weight average molecular weight of each vinyl aromatic monomer unit block before hydrogenation will be less than or equal to 15,000, more preferably less than or equal to 13,000 and most preferably less than or equal to 12,000.

It is important to note that each individual block of the hydrogenated block copolymer of the present invention, can have its own distinct molecular weight. In other words, for example, two vinyl aromatic polymer blocks may each have a different molecular weight.

$M_p$ and $M_{w'}$, as used to throughout the specification, are determined using gel permeation chromatography (GPC). The molecular weight of the substantially hydrogenated block polymer and properties obtained are dependent upon the molecular weight of each of the monomer unit blocks. For substantially hydrogenated block polymers, molecular weights are determined by comparison to narrow polydispersity homopolymer standards corresponding to the different monomer unit segments (for example, polystyrene and polybutadiene standards are used for SBS block copolymers) with adjustments based on the composition of the block copolymer. Also for example, for a triblock copolymer composed of styrene (S) and butadiene (B), the copolymer molecular weight can be obtained by the following equation:

$$\ln Mc = x \ln Ma + (1-x) \ln Mb$$

where Mc is the molecular weight of the copolymer, x is the weight fraction of S in the copolymer, Ma is the apparent molecular based on the calibration for S homopolymer and Mb is the apparent molecular weight based on the calibration for homopolymer B. This method is described in detail by L. H. Tung, *Journal of Applied Polymer Science*, volume 24,953,1979, the disclosure of which is incorporated herein by reference.

Methods of making block polymers are well known in the art. Typically, block polymers are made by anionic polymerization, examples of which are cited in *Anionic Polymerization: Principles and Practical Applications*, H. L. Hsieh and R. P. Quirk, Marcel Dekker, New York, 1996, the disclosure of which is incorporated herein by reference. Block polymers can be made by sequential monomer addition to a carbanionic initiator such as sec-butyl lithium or n-butyl lithium. Block polymers can also be made by coupling a triblock material with a divalent coupling agent such as 1,2-dibromoethane, dichlorodimethylsilane, or phenylbenzoate. In this method, a small chain (less than 10 monomer repeat units) of a conjugated diene monomer can be reacted with the vinyl aromatic monomer unit coupling end to facilitate the coupling reaction. Note, however, vinyl aromatic polymer blocks are typically difficult to couple, therefore, this technique is commonly used to achieve coupling of the vinyl aromatic polymer ends. The small chain of the conjugated diene monomer unit does not constitute a distinct block since no microphase separation is achieved.

Coupling reagents and strategies which have been demonstrated for a variety of anionic polymerizations are discussed in Hsieh and Quirk, Chapter 12, pgs. 307–331. In another method, a difunctional anionic initiator is used to initiate the polymerization from the center of the block system, wherein subsequent monomer additions add equally to both ends of the growing polymer chain. An example of a such a difunctional initiator is 1,3-bis(1-phenylethenyl) benzene treated with organolithium compounds, as described in U.S. Pat. Nos. 4,200,718 and 4,196,154, which are incorporated herein by reference.

After preparation of the block polymer, the polymer is hydrogenated to remove sites of unsaturation in both the conjugated diene monomer unit block(s) and the vinyl aromatic monomer unit block(s) of the polymer. Any method of hydrogenation can be used where suitable methods typically include the use of metal catalysts supported on an inorganic substrate, such as Pd on $BaSO_4$ (U.S. Pat. No. 5,352,744) and Ni on kieselguhr (U.S. Pat. No. 3,333,024), both of which are incorporated herein by reference. Additionally, soluble, homogeneous catalysts such those prepared from combinations of transition metal salts of 2-ethylhexanoic acid and alkyl lithiums can be used to fully saturate block copolymers, as described in Die Makromolekulare Chemie, Volume 160, pp. 291,1972, the disclosure of which is incorporated herein by reference.

Hydrogenation can also be achieved using hydrogen and a heterogeneous catalyst such as those described in U.S. Pat. Nos. 5,352,744; 5,612,422 and 5,645,253, the disclosures of which are incorporated herein by reference. The catalysts described therein are heterogeneous catalysts consisting of a metal crystallite supported on a porous silica substrate. An example of a silica supported catalyst which is especially useful in the polymer hydrogenation is a silica which has a surface area of at least 10 m²/g which is synthesized such that is contains pores with diameters ranging between 3000 and 6000 Angstroms. This silica is then impregnated with a metal capable of catalyzing hydrogenation of the polymer, such as nickel, cobalt, rhodium, ruthenium, palladium, platinum, other Group Vlll metals, combinations or alloys thereof. Other heterogeneous catalysts can also be used, having average pore diameters in the range of 500 to 3,000 Angstroms.

The level of hydrogenation of the substantially hydrogenated block polymers used in the present invention is greater than 95 percent for the conjugated diene monomer unit block(s) and greater than 90 percent for the vinyl aromatic monomer unit block(s), preferably greater than 99 percent for the conjugated diene monomer unit block(s) and greater than 95 percent for the vinyl aromatic monomer unit block (s), more preferably greater than 99.5 percent for the conjugated diene monomer unit block(s) and greater than 98 percent for the vinyl aromatic monomer unit block(s), and most preferably greater than 99.9 percent for the conjugated diene monomer unit block(s) and 99.5 percent for the vinyl aromatic monomer unit block(s).

The term "level of hydrogenation" refers to the percentage of the original unsaturated bonds that become saturated upon hydrogenation. The level of hydrogenation for the (hydrogenated) vinyl aromatic monomer unit block(s) can be determined using UV-VIS spectrophotometry, while the level of hydrogenation for the (hydrogenated) diene conjugated monomer unit block(s) can be determined using proton NMR.

The block polymer composition (that is, ratio of conjugated diene monomer unit blocks to vinyl aromatic monomer unit blocks) can be determined using proton NMR and a comparative integration technique such as that described by Santee, Chang and Morton in *Journal of Polymer Science: Polymer Letter Edition*, Vol. 11, page 449 (1973), the disclosure of which is incorporated herein by reference. Conveniently, a Varian Inova NMR unit set at 300 MHz for $^1$H is used and samples of the block polymer are analyzed as 4 percent solutions (w/v) in $CDCl_3$ (deuterochloroform).

Individual block lengths can be calculated from the weight average molecular weight, $M_w$, and $^1$H NMR compositional analysis and by assuming a symmetrical structure (for example, a triblock with terminal polystyrene blocks).

Homogeneously Branched Ethylene Interpolymer

The term "homogeneously branched ethylene polymer" is used herein in the conventional sense to refer to an ethylene interpolymer in which the comonomer is randomly distributed within a given polymer molecule and wherein substantially all of the polymer molecules have the same ethylene to comonomer molar ratio. The term refers to an ethylene interpolymer that are manufactured using so-called homogeneous or single-site catalyst systems known in the art such Ziegler vanadium, hafnium and zirconium catalyst systems and metallocene catalyst systems for example, a constrained geometry catalyst systems which is further described herein below.

Homogeneously branched ethylene polymers for use in the present invention can be also described as having less than 15 weight percent, preferably less 10 weight percent, more preferably less than 5 and most preferably zero (0) weight percent of the polymer with a degree of short chain branching less than or equal to methyls/1000 carbons. That is, the polymer contains no measurable high density polymer fraction(for example, there is no fraction having a density of equal to or greater than 0.94 g/cm³), as determined, for example, using a temperature rising elution fractionation (TREF) technique and infrared or 13C nuclear magnetic resonance (NMR) analysis.

Preferably, the homogeneously branched ethylene polymer is characterized as having a narrow, essentially single melting TREF profile/curve and essentially lacking a measurable high density polymer portion, as determined using a temperature rising elution fractionation technique (abbreviated herein as "TREF").

The composition distribution of an ethylene interpolymer can be readily determined from TREF as described, for example, by Wild et al., *Journal of Polymer Science, Poly. Phys. Ed.*, Vol.20, p. 441 (1982), or in U.S. Pat. Nos. 4,798,081; 5,008,204; or by L. D. Cady, "The Role of Comonomer Type and Distribution in LLDPE Product Performance," SPE Regional Technical Conference, Quaker Square Hilton, Akron, Ohio, October 1–2, pp.107–119 (1985), the disclosures of all which are incorporated herein by reference.

The composition (monomer) distribution of the interpolymer can also be determined using $^{13}C$ NMR analysis in accordance with techniques described in U.S. Pat. No. 5,292,845; U.S. Pat. No. 4,798,081; U.S. Pat. No. 5,089,321 and by J. C. Randall, *Rev. Macromol. Chem. Phys.*, C29, pp. 201–317 (1989), the disclosures of all which are incorporated herein by reference.

In analytical temperature rising elution fractionation analysis (as described in U.S. Pat. No. 4,798,081 and abbreviated herein as "ATREF"), the polymer, polymer composition or article to be analyzed is dissolved in a suitable hot solvent (for example, trichlorobenzene) and allowed to crystallized in a column containing an inert support (stainless steel shot) by slowly reducing the temperature. The column is equipped with both a refractive index detector and a differential viscometer (DV) detector. An ATREF-DV chromatogram curve is then generated by eluting the crystallized polymer sample from the column by slowly increasing the temperature of the eluting solvent (trichlorobenzene). The ATREF curve is also frequently called the short chain branching distribution (SCBD) or composition distribution (CD) curve, since it indicates how evenly the comonomer (for example, 1-octene) is distributed throughout the sample in that as elution temperature decreases, comonomer content increases. The refractive index detector provides the short chain distribution information and the differential viscometer detector provides an estimate of the viscosity average molecular weight. The composition distribution and other compositional information can also be determined using crystallization analysis fractionation such as the CRYSTAF fractionalysis package available commercially from PolymerChar, Valencia, Spain.

Preferred homogeneously branched ethylene polymers (such as, but not limited to, substantially linear ethylene polymers) have a single melting peak between −30 and 150° C., as determined using differential scanning calorimetry (DSC), as opposed to traditional Ziegler polymerized heterogeneously branched ethylene polymers (for example, LLDPE and ULDPE or VLDPE) which have two or more melting points.

The single melting peak is determined using a differential scanning calorimeter standardized with indium and deionized water. The method involves about 5–7 mg sample sizes, a "first heat" to about 180° C. which is held for 4 minutes, a cool down at 10° C./min. to −30° C. which is held for 3 minutes, and heat up at 10° C./min. to 150° C. to provide a "second heat" heat flow vs. temperature curve from which the melting peak(s) is obtained. Total heat of fusion of the polymer is calculated from the area under the curve.

The at least one homogeneously branched ethylene interpolymer to be irradiated and/or crosslinked has a density at 23° C. less than 0.90 g/cm³, preferably less than or equal to 0.88 g/cm³, more preferably less than or equal to 0.87 g/cm³, and especially in the range of 0.86 g/cm³ to 0.875 g/cm³, as measured in accordance with ASTM D792.

Preferably, the homogeneously branched ethylene interpolymer is characterized as having a melt index less than 100 g/10 minutes, more preferably less than 30, most preferably less than 10 g/10 minutes or in the range of 3 to 12 g/10 minutes, as determined in accordance with ASTM D-1238, Condition 190° C./2.16 kilogram (kg). ASTM D-1238, Condition 190° C./2.16 kilogram (kg) are referred to herein as "$I_2$ melt index".

The homogeneously branched ethylene polymers for use in the invention can be either a substantially linear ethylene polymer or a homogeneously branched linear ethylene polymer.

The term "linear" as used herein means that the ethylene polymer does not have long chain branching. That is, the polymer chains comprising the bulk linear ethylene polymer have an absence of long chain branching, as in the case of traditional linear low density polyethylene polymers or linear high density polyethylene polymers made using Ziegler polymerization processes (for example, U.S. Pat. No. 4,076,698 (Anderson et al.)), sometimes called heterogeneous polymers. The term "linear" does not refer to bulk high pressure branched polyethylene, ethylene/vinyl acetate copolymers, or ethylene/vinyl alcohol copolymers which are known to those skilled in the art to have numerous long chain branches.

The term "homogeneously branched linear ethylene polymer" refers to polymers having a narrow short chain branching distribution and an absence of long chain branching. Such "linear" uniformly branched or homogeneous polymers include those made as described, for example, in U.S. Pat. No. 3,645,992 (Elston) and those made, for example, using so-called single site catalysts in a batch reactor having relatively high ethylene concentrations (as described in U.S. Pat. No. 5,026,798 (Canich) or in U.S. Pat. No. 5,055,438 (Canich)) or those made using vanadium catalysts or those made using constrained geometry catalysts in a batch reactor also having relatively high olefin concentrations (as described in U.S. Pat. No. 5,064,802 (Stevens et al.) or in EP 0 416 815 A2 (Stevens et al.)).

Typically, homogeneously branched linear ethylene polymers are ethylene/α-olefin interpolymers, wherein the α-olefin is at least one $C_3$–$C_{20}$ α-olefin (for example, propylene, 1-butene, 1-pentene, 4-methyl-1-pentene, 1-heptene, 1-hexene, 1-octene and the like) and preferably the at least one $C_3$–$C_{20}$ α-olefin is 1-butene, 1-hexene, 1-heptene or 1-octene. Most preferably, the ethylene/α-olefin interpolymer is a copolymer of ethylene and a $C_3$–$C_{20}$ α-olefin, and especially an ethylene/$C_4$–$C_8$ α-olefin copolymer such as an ethylene/1-octene copolymer, ethylene/1-butene copolymer, ethylene/1-pentene copolymer or ethylene/1-hexene copolymer.

Suitable homogeneously branched linear ethylene polymers for use in the invention are sold under the designation of TAFMER by Mitsui Chemical Corporation and under the designations of EXACT and EXCEED resins by Exxon Chemical Company.

The term "substantially linear ethylene polymer" as used herein means that the bulk ethylene polymer is substituted, on average, with about 0.01 long chain branches/1000 total carbons to about 3 long chain branches/1000 total carbons (wherein "total carbons" includes both backbone and branch carbons). Preferred polymers are substituted with about 0.01 long chain branches/1000 total carbons to about 1 long chain branches/1000 total carbons, more preferably from about 0.05 long chain branches/1000 total carbons to about 1 long chain branched/1000 total carbons, and especially from about 0.3 long chain branches/1000 total carbons to about 1 long chain branches/1000 total carbons.

As used herein, the term "backbone" refers to a discrete molecule, and the term "polymer" or "bulk polymer" refers, in the conventional sense, to the polymer as formed in a reactor. For the polymer to be a "substantially linear ethylene polymer", the polymer must have at least enough molecules with long chain branching such that the average long chain branching in the bulk polymer is at least an average of from about 0.01/1000 total carbons to about 3 long chain branches/1000 total carbons.

The term "bulk polymer" as used herein means the polymer which results from the polymerization process as a mixture of polymer molecules and, for substantially linear ethylene polymers, includes molecules having an absence of long chain branching as well as molecules having long chain branching. Thus a "bulk polymer" includes all molecules formed during polymerization. It is understood that, for the substantially linear polymers, not all molecules have long chain branching, but a sufficient amount do such that the average long chain branching content of the bulk polymer positively affects the melt rheology (that is, the shear viscosity and melt fracture properties) as described herein below and elsewhere in the literature.

Long chain branching (LCB) is defined herein as a chain length of at least one (1) carbon less than the number of carbons in the comonomer, whereas short chain branching (SCB) is defined herein as a chain length of the same number of carbons in the residue of the comonomer after it is incorporated into the polymer molecule backbone. For example, a substantially linear ethylene/1-octene polymer has backbones with long chain branches of at least seven (7) carbons in length, but it also has short chain branches of only six (6) carbons in length.

Long chain branching can be distinguished from short chain branching by using $^{13}C$ nuclear magnetic resonance (NMR) spectroscopy and to a limited extent, for example, for ethylene homopolymers, it can be quantified using the method of Randall, (*Rev. Macromol.Chem. Phys.*, C29 (2&3), p.285–297 (1989)), the disclosure of which is incorporated herein by reference. However as a practical matter, current $^{13}C$ nuclear magnetic resonance spectroscopy cannot determine the length of a long chain branch in excess of about six (6) carbon atoms and as such, this analytical technique cannot distinguish between a seven (7) carbon branch and a seventy (70) carbon branch. The long chain branch can be as long as about the same length as the length of the polymer backbone.

Although conventional $^{13}C$ nuclear magnetic resonance spectroscopy cannot determine the length of a long chain branch in excess of six carbon atoms, there are other known techniques useful for quantifying or determining the presence of long chain branches in ethylene polymers, including ethylene/1-octene interpolymers. For example, U.S. Pat. No. 4,500,648, incorporated herein by reference, teaches that long chain branching frequency (LCB) can be represented by the equation $LCB=b/M_w$ wherein b is the weight average number of long chain branches per molecule and Mw is the weight average molecular weight. The molecular weight averages and the long chain branching characteristics are determined by gel permeation chromatography and intrinsic viscosity methods, respectively.

Two other useful methods for quantifying or determining the presence of long chain branches in ethylene polymers, including ethylene/1-octene interpolymers are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, for example, Zimm, G. H. and Stockmayer, W. H., *J. Chem. Phys.*, 17, 1301 (1949) and Rudin, A., *Modern Methods of Polymer Characterization*, John Wiley & Sons, New York (1991) pp. 103–112, the disclosures of both of which are incorporated by reference.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is indeed a useful technique for quantifying the presence of long chain branches in substantially linear ethylene polymers. In particular, deGroot and Chum found that the level of long chain branches in substantially linear ethylene homopolymer samples measured using the Zimm-Stockmayer equation correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV can be used to quantify the level of long chain branches in substantially linear ethylene/octene copolymers.

DeGroot and Chum also showed that a plot of $Log(I_2$, melt index) as a function of Log(GPC Weight Average Molecular Weight) as determined by GPC-DV illustrates that the long chain branching aspects (but not the extent of long branching) of substantially linear ethylene polymers are comparable to that of high pressure, highly branched low density polyethylene (LDPE) and are clearly distinct from ethylene polymers produced using Ziegler-type catalysts such as titanium complexes and ordinary homogeneous catalysts such as hafnium and vanadium complexes.

For substantially linear ethylene polymers, the empirical effect of the presence of long chain branching is manifested as enhanced rheological properties which are quantified and expressed in terms of gas extrusion rheometry (GER) results and/or melt flow, $I_{10}/I_2$, increases.

The substantially linear ethylene polymers used in the present invention are a unique class of compounds that are further defined in U.S. Pat. No. 5,272,236, application Ser. No. 07/776,130, filed Oct. 15, 1991; U.S. Pat. No. 5,278,272, application Ser. No. 07/939,281, filed Sep. 2, 1992; and U.S. Pat. No. 5,665,800, application Ser. No. 08/730,766, filed Oct. 16, 1996, each of which is incorporated herein by reference.

Substantially linear ethylene polymers differ significantly from the class of polymers conventionally known as homogeneously branched linear ethylene polymers described above and, for example, by Elston in U.S. Pat. No. 3,645,992. As an important distinction, substantially linear ethylene polymers do not have a linear polymer backbone in the conventional sense of the term "linear" as is the case for homogeneously branched linear ethylene polymers.

Substantially linear ethylene polymers also differ significantly from the class of polymers known conventionally as heterogeneously branched traditional Ziegler polymerized linear ethylene interpolymers (for example, ultra low density polyethylene, linear low density polyethylene or high density polyethylene made, for example, using the technique disclosed by Anderson et al. in U.S. Pat. No. 4,076,698) in that substantially linear ethylene interpolymers are homogeneously branched polymers. Further, substantially linear ethylene polymers also differ from the class of heterogeneously branched ethylene polymers in that substantially linear ethylene polymers are characterized as essentially lacking a measurable high density or crystalline polymer fraction as determined using a temperature rising elution fractionation technique.

The substantially linear ethylene elastomers and plastomers for use in the present invention is characterized as having (a) melt flow ratio, $I_{10}/I_2 \geq 5.63$, (b) a molecular weight distribution, $M_w/M_n$, as determined by gel permeation chromatography and defined by the equation:

$$(M_w/M_n) \leq (I_{10}/I_2) - 4.63,$$

(c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an $I_2$ and $M_w/M_n$ within ten percent of the substantially linear ethylene polymer and wherein the respective critical shear rates of the substantially linear ethylene polymer and the linear ethylene polymer are measured at the same melt temperature using a gas extrusion rheometer, (d) a single differential scanning calorimetry, DSC, melting peak between $-30°$ and $150°$ C., and (e) a density less than or equal to $0.865$ g/cm$^3$.

Determination of the critical shear rate and critical shear stress in regards to melt fracture as well as other rheology properties such as "Theological processing index" (PI), is performed using a gas extrusion rheometer (GER). The gas extrusion rheometer is described by M. Shida, R. N. Shroff and L. V. Cancio in *Polymer Engineering Science*, Vol.17, No.11, p. 770 (1977) and in *Rheometers for Molten Plastics* by John Dealy, published by Van Nostrand Reinhold Co. (1982) on pp. 97–99, the disclosures of both of which are incorporated herein by reference.

The processing index (PI) is measured at a temperature of $190°$ C., at nitrogen pressure of 2500 psig using a 0.0296 inch (752 microns) diameter (preferably a 0.0143(363 microns) inch diameter die for high flow polymers, for example, 50–100 $I_2$ melt index or greater), 20:1 L/D die having an entrance angle of $180°$. The GER processing index is calculated in millipoise units from the following equation:

$$PI = 2.15 \times 10^6 \text{ dyne/cm}^2 / (1000 \times \text{ shear rate}),$$

where: $2.15 \times 10^6$ dyne/cm$^2$ (215 MPa) is the shear stress at 2500 psi (176 kg/cm$^2$), and the shear rate is the shear rate at the wall as represented by the following equation:

$$32 \text{ Q'}/(60 \text{ sec/min})(0.745)(\text{Diameter} \times 2.54 \text{ cm/in})^3,$$

where:

Q' is the extrusion rate (gms/min), 0.745 is the melt density of polyethylene (gm/cm$^3$), and Diameter is the orifice diameter of the capillary (inches).

The PI is the apparent viscosity of a material measured at apparent shear stress of $2.15 \times 10^6$ dyne/cm$^2$ (215 MPa).

For substantially linear ethylene polymers, the PI is less than or equal to 70 percent of that of a conventional linear ethylene polymer having an $I_2$, $M_w/M_n$ and density each within ten percent of the substantially linear ethylene polymer.

An apparent shear stress vs. apparent shear rate plot is used to identify the melt fracture phenomena over a range of nitrogen pressures from 5250 to 500 psig(369 to 35 kg/cm$^2$) using the die or GER test apparatus previously described. According to Ramamurthy in *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture is characterized at the beginning of losing extrudate gloss at which the surface roughness of extrudate can only be detected by 40× magnification. The critical shear rate at onset of surface melt fracture for the substantially linear ethylene polymers is at least 50 percent greater than the critical shear rate at the onset of surface melt fracture of a linear ethylene polymer having about the same $I_2$ and $M_w/M_n$. Preferably, the critical shear stress at onset of surface melt fracture for the substantially linear ethylene polymers of the invention is greater than $2.8 \times 106$ dyne/cm$^2$ (280 MPa).

Gross melt fracture occurs at unsteady flow conditions and ranges in detail from regular (alternating rough and smooth, helical, etc.) to random distortions. For commercial acceptability (for example, in blown film products), surface defects should be minimal, if not absent. The critical shear rate at onset of surface melt fracture (OSMF) and critical shear stress at onset of gross melt fracture (OGMF) will be used herein based on the changes of surface roughness and configurations of the extrudates extruded by a GER. For the substantially linear ethylene polymers used in the invention, the critical shear stress at onset of gross melt fracture is preferably greater than $4 \times 10^6$ dyne/cm$^2$ (400 MPa).

For the processing index determination and for the GER melt fracture determination, substantially linear ethylene polymers are tested without inorganic fillers and do not have more than 20 ppm (parts per million) aluminum catalyst residue. Preferably, however, for the processing index and melt fracture tests, substantially linear ethylene polymers do contain antioxidants such as phenols, hindered phenols, phosphites or phosphonites, preferably a combination of a phenol or hindered phenol and a phosphite or a phosphonite.

The molecular weights and molecular weight distributions are determined by gel permeation chromatography (GPC). A suitable unit is a Waters 150C high temperature chromatographic unit equipped with a differential refractometer and three columns of mixed porosity where columns are supplied by Polymer Laboratories and are commonly packed with pore sizes of $10^3$, $10^4$, $10^5$ and $10^6$ Å. For ethylene polymers, the unit operating temperature is about 140° C. and the solvent is 1,2,4-trichlorobenzene, from which about 0.3 percent by weight solutions of the samples are prepared for injection. Conversely, for the substantially hydrogenated block polymers, the unit operating temperature is about 25° C. and tetrahydrofuran is used as the solvent. A suitable flow rate is about 1.0 milliliters/minute and the injection size is typically about 100 microliters.

For the ethylene polymers where used in the present invention, the molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621,1968, the disclosure of which is incorporated herein by reference) to derive the following equation:

$$M_{polyethylene} = a*(M_{polystyrene})^b.$$

In this equation, a=0.4316 and b=1.0. Weight average molecular weight, $M_w$, is calculated in the usual manner according to the following formula: $Mj = (\Sigma w_i(M_i^j))^j$. Where $w_i$ is the weight fraction of the molecules with molecular weight $M_i$ eluting from the GPC column in fraction i and j=1 when calculating $M_w$ and j=−1 when calculating $M_n$.

For the at least one homogeneously branched ethylene polymer used in the present invention, the $M_w/M_n$ is preferably less than 3.5, more preferably less than 3.0, most preferably less than 2.5, and especially in the range of from about 1.5 to about 2.5 and most especially in the range from about 1.8 to about 2.3.

Substantially linear ethylene polymers are known to have excellent processability, despite having a relatively narrow molecular weight distribution (that is, the $M_w/M_n$ ratio is typically less than 3.5). Surprisingly, unlike homogeneously and heterogeneously branched linear ethylene polymers, the melt flow ratio ($I_{10}/I2$) of substantially linear ethylene polymers can be varied essentially independently of the molecular weight distribution, $M_w/M_n$. Accordingly, especially when good extrusion processability is desired, the preferred ethylene polymer for use in the present invention is a homogeneously branched substantially linear ethylene interpolymer.

Suitable constrained geometry catalysts for use manufacturing substantially linear ethylene polymers include constrained geometry catalysts as disclosed in U.S. application Ser. No. 07/545,403, filed Jul. 3, 1990; U.S. application Ser. No. 07/758,654, filed Sep. 12, 1991; U.S. Pat. No. 5,132,380 (application Ser. No. 07/758,654); U.S. Pat. No. 5,064,802 (application Ser. No. 07/547,728); U.S. Pat. No. 5,470,993; U.S. Pat. No. 5,453,410 U.S. Pat. No. 5,374,696 application Ser. No. 08/08,003); U.S. Pat. No. 5,532,394U.S. Pat. No. 5,494,874 and U.S. Pat. No. 5,189,192, the teachings of all of which are incorporated herein by reference.

Suitable catalyst complexes may also be prepared according to the teachings of WO 93/08199, and the patents issuing therefrom, all of which are incorporated herein by reference. Further, the monocyclopentadienyl transition metal olefin polymerization catalysts taught in U.S. Pat. No. 5,026,798, which is incorporated herein by reference, are also believed to be suitable for use in preparing the polymers of the present invention, so long as the polymerization conditions substantially conform to those described in U.S. Pat. No. 5,272,236; U.S. Pat. No. 5,278,272 and U.S. Pat. No. 5,665,800, especially with strict attention to the requirement of continuous polymerization. Such polymerization methods are also described in PCT/US92/08812 (filed Oct. 15, 1992).

The foregoing catalysts may be further described as comprising a metal coordination complex comprising a metal of groups 3–10 or the Lanthanide series of the Periodic Table of the Elements and a delocalize β-bonded moiety substituted with a constrain-inducing moiety, said complex having a constrained geometry about the metal atom such that the angle at the metal between the centroid of the delocalized, substituted pi-bonded moiety and the center of at least one remaining substituent is less than such angle in a similar complex containing a similar pi-bonded moiety lacking in such constrain-inducing substituent, and provided further that for such complexes comprising more than one delocalized, substituted pi-bonded moiety, only one thereof for each metal atom of the complex is a cyclic, delocalized, substituted pi-bonded moiety. The catalyst further comprises an activating cocatalyst.

Suitable cocatalysts for use herein include polymeric or oligomeric aluminoxanes, especially methyl aluminoxane, as well as inert, compatible, noncoordinating, ion-forming compounds. So-called modified methyl aluminoxane (MMAO) is also suitable for use as a cocatalyst. One technique for preparing such modified aluminoxane is disclosed in U.S. Pat. No. 5,041,584, the disclosure of which is incorporated herein by reference. Aluminoxanes can also be made as disclosed in U.S. Pat. No. 5,218,071; U.S. Pat. No. 5,086,024; U.S. Pat. No. 5,041,585; U.S. Pat. No. 5,041,583; U.S. Pat. No. 5,015,749; U.S. Pat. No. 4,960,878; and U.S. Pat. No. 4,544,762, the disclosures of all of which are incorporated herein by reference.

Aluminoxanes, including modified methyl aluminoxanes, when used in the polymerization, are preferably used such that the catalyst residue remaining in the (finished) polymer is preferably in the range of from about 0 to about 20 ppm aluminum, especially from about 0 to about 10 ppm aluminum, and more preferably from about 0 to about 5 ppm aluminum. In order to measure the bulk polymer properties (for example, PI or melt fracture), aqueous HCl is used to extract the aluminoxane from the polymer. Preferred cocatalysts, however, are inert, noncoordinating, boron compounds such as those described in EP 520732, the disclosure of which is incorporated herein by reference.

Substantially linear ethylene are produced via a continuous (as opposed to a batch) controlled polymerization process using at least one reactor (for example, as disclosed in WO 93/07187, WO 93/07188, and WO 93/07189, the disclosure of each of which is incorporated herein by reference), but can also be produced using multiple reactors (for example, using a multiple reactor configuration as described in U.S. Pat. No. 3,914,342, the disclosure of which is incorporated herein by reference) at a polymerization temperature and pressure sufficient to produce the interpolymers having the desired properties. The multiple reactors can be operated in series or in parallel, with at least one constrained geometry catalyst employed in at least one of the reactors.

Substantially linear ethylene polymers can be prepared via the continuous solution, slurry, or gas phase polymerization in the presence of a constrained geometry catalyst, such as the method disclosed in EP 416,815-A, the disclosure of which is incorporated herein by reference. The polymerization can generally be performed in any reactor system known in the art including, but not limited to, a tank reactor(s), a sphere reactor(s), a recycling loop reactor(s) or combinations thereof and the like, any reactor or all reactors operated partially or completely adiabatically, nonadiabatically or a combination of both and the like. Preferably, a continuous loop-reactor solution polymerization process is used to manufacture the substantially linear ethylene polymer used in the present invention.

In general, the continuous polymerization required to manufacture substantially linear ethylene polymers may be accomplished at conditions well known in the prior art for Ziegler-Natta or Kaminsky-Sinn type polymerization reactions, that is, temperatures from 0 to 250° C. and pressures from atmospheric to 1000 atmospheres (100 MPa). Suspension, solution, slurry, gas phase or other process conditions may be employed if desired.

A support may be employed in the polymerization, but preferably the catalysts are used in a homogeneous (that is, soluble) manner. It will, of course, be appreciated that the active catalyst system forms in situ if the catalyst and the cocatalyst components thereof are added directly to the polymerization process and a suitable solvent or diluent, including condensed monomer, is used in said polymerization process. It is, however, preferred to form the active catalyst in a separate step in a suitable solvent prior to adding the same to the polymerization mixture.

In preferred embodiments, for olefin polymers in general and for ethylene polymers made in solution processes in particular, methods and procedures are employed to ensure low or no gels are made during polymerization or are present in the resultant polymer product. Such methods and procedures include introducing a very small amount of an impurity into the feed stream to temporarily poison the active catalyst immediately at the point of feed injection into the reactor or polymerization vessel. This method or procedure provides for a slight delay of the initial reaction (polymerization), thereby permitting polymerization to proceed after the feed is sufficiently mixed with regard to reactants and reactor contents. Suitable impurities include, but are not limited to, water, carbon dioxide, alcohols, acids and esters. In a generally preferred method, a small fraction of the recycle feed stream that is set up to bypass purification equipment and/or purifying conditions is reintroduced in the reactor or polymerization vessel. These recycle impurities typically include finishing additives such as, for example, processing aids (for example, calcium stearate and fluoropolymers), catalyst deactivators, antioxidants and other thermal stabilizers as well as polymerization by-products or decomposition products such as water.

The homogeneously branched ethylene interpolymers (for example, substantially linear ethylene polymers and homogeneously branched linear ethylene polymers) used in the present invention are interpolymers of ethylene with at least one $C_3$–$C_{20}$ α-olefin and/or $C_4$–$C_{18}$ diolefin. Copolymers of ethylene and an α-olefin of $C_3$–$C_{20}$ carbon atoms are especially preferred. The term "interpolymer" as discussed above is used herein to indicate a copolymer, or a terpolymer, where, at least one other comonomer is polymerized with ethylene or propylene to make the interpolymer.

Suitable unsaturated comonomers useful for polymerizing with ethylene include, for example, ethylenically unsaturated monomers, conjugated or non-conjugated dienes, polyenes, etc. Examples of such comonomers include $C_3$–$C_{20}$ α-olefins such as propylene, isobutylene, 1-butene, 1-hexene, 1-pentene, 4-methyl-1-pentene, 1-heptene, 1-octene, 1-nonene, 1-decene, and the like. Preferred comonomers include propylene, 1-butene, 1-pentene, 1-hexene, 4-methyl-1-pentene, 1-heptene, and 1-octene, and 1-octene is especially preferred. Other suitable monomers include styrene, halo- or alkyl-substituted styrenes, vinylbenzocyclobutane, 1,4-hexadiene, 1,7-octadiene, and naphthenics (for example, cyclopentene, cyclohexene and cyclooctene).

In one preferred embodiment, at least one substantially hydrogenated block polymer is blended with at least one substantially linear ethylene polymer. In another preferred embodiment, at least one substantially hydrogenated block polymer is blended with at least one polypropylene polymer. Suitable polypropylene polymers for use in the invention, including random block propylene ethylene polymers, are available from a number of manufacturers, such as, for example, Montell Polyolefins and Exxon Chemical Company. From Exxon, suitable polypropylene polymers are supplied under the designations ESCORENE and ACHIEVE.

Other polymers that can be blended with either the substantially hydrogenated block polymer or the homogeneously branched ethylene interpolymer include, for example, but are not limited to, substantially hydrogenated block polymers, styrene block polymers, substantially linear ethylene polymers, homogeneously branched linear ethylene polymers, heterogeneously branched linear ethylene (including linear low density polyethylene (LLDPE), ultra or very low density polyethylene (ULDPE or VLDPE) medium density polyethylene (MDPE) and high density polyethylene (HDPE)), high pressure low density polyethylene (LDPE), ethylene/acrylic acid (EAA) copolymers, ethylene/methacrylic acid (EMAA) copolymers, ethylene/acrylic acid (EAA) ionomers, ethylene/methacrylic acid (EMAA) ionomers, ethylene/vinyl acetate (EVA) copolymers, ethylene/vinyl alcohol (EVOH) copolymers, polypropylene homopolymers and copolymers, ethylene/propylene polymers, ethylene/styrene interpolymers, graft-modified polymers (for example, maleic anhydride grafted polyethylene such as LLDPE g-MAH), ethylene acrylate copolymers (for example, ethylene/ethyl acrylate (EEA) copolymers, ethylene/methyl acrylate (EMA), and ethylene/methmethyl acrylate (EMMA) copolymers), polybutylene (PB), ethylene carbon monoxide interpolymer (for example, ethylene/carbon monoxide (ECO), copolymer, ethylene/acrylic acid/carbon monoxide (EAACO) terpolymer, ethylene/methacrylic acid/carbon monoxide (EMMCO) terpolymer, ethylene/vinyl acetate/carbon monoxide (EVACO) terpolymer and styrene/carbon monoxide (SCO)), chlorinated polyethylene and mixtures thereof.

EXPERIMENTAL

In an evaluation to determine the effects of irradiation under different atmospheres with different stabilization packages, a substantially linear ethylene polymer, AFFINITY™ elastomer 8200 from The Dow Chemical Company, was selected. This polymer was an ethylene/1-octene interpolymer, made using a constrained geometry catalyst system and had a target density of 0.87 g/cm$^3$ and an $I_2$ melt index of 5 g/10 min. As manufactured, the polymer also contained 500 ppm of Iragnox 1076, a phenolic antioxidant supplied by Ciba Specialty Chemicals, and 800 ppm of Sandostab P-EPQ, diphosphonite supplied by Clariant Corp.

Other stabilizing additives used in this evaluation included Cyanox 1790, a phenolic stabilizer from Cytec Industries Inc.; Chimissorb 944, a hindered amine, and Irgafos 168 (I-168), a phosphite stabilizer, both from Ciba Specialty Chemical; and Agerite D, an aromatic amine stabilizer from Uniroyal Chemical. These other stabilizing additives were incorporated into the AFFINITY™ elastomer 8200 using a twin-screw extruder and individual masterbatch concentrates (3 weight percent) containing the respective additive.

In a second evaluation, the polymer used was a substantially hydrogenated block polymer having a $M_w$ of about 63,000 and a polydispersity of about 1.0.

Samples were melt-spun into 70 denier (avg.) fibers at about a 4 gm/min/hole output rate. For samples based on the AFFINITY™ polymer, fibers were prepared using a melt temperature of 230° C. and a die with a 28 mil (0.71 mm) diameter and $L/D$ of 3.5. For samples based on the substantially hydrogenated block polymer, elastic fibers were prepared using a melt temperature of 260° C. and a die having a 28 mil (0.71 mm) diameter and a $L/D$ of 3.5.

To irradiate sample fibers under an inert or reduced oxygen atmosphere, a nitrogen purge was carried out in a fume hood. Six fiber spools were placed in a five-gallon size ZIPLOC™ bag. The ZIPLOC was partly sealed leaving an opening for a rubber hose that was connected to the nitrogen gas source. The ZIPLOC bag was then placed in a Shield Pack SP Class E Style 1.3 Pouch which was an aluminum bag with polyethylene liner. The rubber hose was then placed at the opening of ZIPLOC bag and nitrogen was permitted to flow into the ZIPLOC bag for 3 hours. The nitrogen flow rate was adjusted so that the bag was maintained at a slightly inflated state during 3 hours. After the 3 hours nitrogen purge, the rubber hose was removed while simultaneously and in a continuous motion lightly pressing on ZIPLOC bag to closing the opening.

Next, the Shield Pack was heat sealed to leave only about a one inch (2.5 cm) opening. The rubber hose was placed through this opening and the nitrogen flow was turn on and permitted to purge for 10 minutes. After the 10-minute purge, the hose was removed and the edge of the opening was folded over and heat sealed while simultaneously and in a continuous motion lightly pressing on the Shield Pack to prevent the entry of air.

The nitrogen padded fiber spools were then electron-beam irradiated using multiple passes at 3.2 Mrad per pass. Control 1, Example 1, and Examples 5 to 11 were cooled to about 23° C. after each pass. Controls 2 and 3, and Examples 2 to 4 were cooled to 5° C. before each pass. The bags were turned upside down for each pass. The multiple passes and cooling after each pass were done to avoid fusion of fibers during E-beam radiation. The temperature of the fiber during E-beam radiation should be lower than 45° C., preferably lower than 40° C. It was found that the sample temperature increased about 15° C. for each pass of 3.2 Mrad radiation. Instead of an aluminum bag, a paper box was used for electron-beam irradiation under air.

The following test methods were used to test the heat resistance of fibers during dyeing and heat setting processes. To simulate dyeing conditions, a Teflon sheet was placed on a metal sheet and twelve fibers per sample was placed on the Teflon sheet with six (6) fibers in each direction. The six cross direction fibers were laid on top of the six forward direction fibers. The fibers were all about 2.5 inches (6.4 cm) long. Scotch tape was used to attach the ends of the fibers on the Teflon sheet. The samples were then heated at 130° C. for 30 min. The samples were then cooled to about 23° C. and a determination of whether fibers stuck or not at the overlaid cross points was made for each sample. In this test, fibers that did not stick at the cross points were considered to have passed the (simulated) dyeing test. To reduce testing time, samples can be heated at 200° C. for 3 min instead of the 130° C. for 30 min.

To simulate heat set conditions, another Teflon sheet was placed on a metal sheet. One end of a fiber having a 2 ½ inch (6.4 cm) length was taped onto the Teflon sheet with a Scotch tape. The fiber was stretched to five inches (12.7 cm) (100% stretch) by hand and held under 100% stretch by taping the other end of the fiber. Three fibers were used for each sample with fibers placed at about 2 inches (5.1 cm) of separation from each other. The stretched fibers were than placed in an oven at 200° C. and the time for the sample to break was recorded. To successfully pass the heat setting test, the time for the sample to break must be longer than 1 minute.

Table 1 shows, fiber samples that were irradiated under air (Controls 1 and 2), even at high radiation doses as well as with the incorporation of the thermal stabilizers, did not exhibit sufficient heat resistance to pass the dyeing or heat setting tests. The samples were stuck after heating at 130° C. for 30 min. Control sample 3 which was irradiated under nitrogen but without the incorporation of an amine stabilizer passed the dyeing test failed the heat setting test since the fiber broken when heated at 200° C. under 100% stretch for less than 1 minute. The control sample with antioxidant and without irradiation (Control 1) was stuck together after heating at 130° C. Inventive Examples 1 to 11 all passed both the dyeing and heat setting tests. The Inventive Examples were irradiated under nitrogen and all contained at least one amine stabilizer such as a hindered amine or aromatic amine and in many instances also contained additional additives such a hinder phenol and 2phosphorus-containing stabilizer. The result shows surprising synergistic effects of radiation under nitrogen and the use of an amine stabilizer in regard to passing dyeing and heat setting processing. Table 1 also shows that the present invention permits a reduction in radiation dose (that is, to ≦20 Mrad).

10 and 11, the inventive examples exhibited far superior heat resistance. That is, Inventive Examples 10 and 11 which were irradiated under nitrogen and stabilized with an amine/phenol stabilizer package passed the dyeing and heat setting tests while Control 1 completely failed the simulated dyeing test and thus could not be tested for its heat setting performance. These results suggest that crosslinking resulting from electron-beam irradiation in air versus crosslinking from electron-beam irradiation under nitrogen exists as different network structures and/or occur via different mechanisms.

TABLE 2

Effect of Irradiation Temperature on Fiber Tenacity and Heat Resistance

| | E-beam irradiation condition | Tenacity (kg) | Elongation (%) | Fiber Break Time at 200° C. under 100% stretch (min) |
|---|---|---|---|---|
| Example 9 | $N_2$ at 23° C. | 0.97 ± 0.06 | 400 ± 13 | 4 |
| Example 2 | $N_2$ at 10° C. | 1.18 ± 0.03 | 390 ± 15 | 15 |

Also, surprisingly, Table 1 demonstrates that the invention permits lower dosages of irradiation for an equivalent degree of crosslinking. This result is very surprising and unexpected because ordinarily the skilled worker would expected less

TABLE 1

Effect of Irradiation Conditions on Heat Resistance of Fibers

| Sample | Irradiated Conditions | C944/C1790 (ppm) | Gel wt. % (xylene) | Sticky at 130° C. for 30 min | Fiber Break Time at 200° C. under 100% stretch (min) |
|---|---|---|---|---|---|
| Control 1 | 32 Mrad in air | 2000/0 | 60 | yes | N/D* |
| Control 2 | 22.4 Mrad in air | 2000/1000 | N/D | yes | N/D* |
| Control 3 | 22.4 Mrad in $N_2$ | 0 | N/D | no | 0.6 |
| Control 4 | 0 | 2000/1000 | N/D | yes | N/D |
| Example 1 | 32 Mrad in $N_2$ | 2000 | N/D | no | 2 |
| Example 2 | 22.4 Mrad in $N_2$ | 2000/1000 | N/D | no | 15 |
| Example 3 | 22.4 Mrad in $N_2$ | 2000/2000 | N/D | no | 33 |
| Example 4 | 22.4 Mrad in $N_2$ | 2000/1000 + 1000 ppm of I-168 | N/D | no | 18 |
| Example 5 | 25.6 Mrad in $N_2$ | 3000/0 | N/D | no | 4 |
| Example 6 | 25.6 Mrad in $N_2$ | Agerite D (only) at 2000 ppm | N/D | no | 28 |
| Example 7 | 32 Mrad in $N_2$ | 2000/1000 | 77 | no | 4 |
| Example 8 | 25.6 Mrad in $N_2$ | 2000/1000 | 73 | no | 5 |
| Example 9 | 22.4 Mrad in $N_2$ | 2000/1000 | 70 | no | 4 |
| Example 10 | 19.2 Mrad in $N_2$ | 2000/1000 | 61 | no | 7 |
| Example 11 | 16 Mrad in $N_2$ | 2000/1000 | 61 | no | 35 |

N/D: not determined.
N/D*: not determines since samples were either melted or stuck together at 130° C.

The effect of electron-beam irradiation dosage on heat resistance is also shown in Table 1 in Inventive Examples 7–11. Inventive Examples 7–11 were irradiated at the same temperature (22° C.) with the same stabilization package (2000 ppm of Chimasorb and 1000 ppm of Cyanox 1790). Expectedly the results show that increased irradiation dosage, increased the degree of crosslinking (as measured by weight percent gel in the xylene extraction test). But surprisingly and unexpectedly, although Control 1 (which was representative of the invention described in WO 99/63021) had the same degree of crosslinking as Inventive Examples crosslinking for those samples where oxygen is excluded or reduced and there a higher level of stabilization. Yet Inventive Examples 10 and 11 exhibited the same degree of crosslinking as Control 1 even though Inventive Examples 10 and 11 were irradiated while oxygen was excluded or reduced and had slightly higher additive concentrations.

Table 2 indicates that the lower irradiation temperatures, the more improved will be tenacity and heat resistance.

To demonstrate adequate service temperatures (that is, heat resistance) for dyeing and finishing and to demonstrate that fiber could be successfully converted, another evaluation was conducted to produce dyed woven and knit goods. In this evaluation, elastic fibers comprising a substantially linear ethylene polymer, e-beam irradiated under nitrogen with amine stabilization (Example 12) were knitted in separate combinations with polyester, cotton, or nylon fibers using an industry standard 18-cut circular knitting machine equipped with positive unwind devices for the elastic yarns. During the knitting, the draft ratio between the elastic yarns and the non-elastic yarns ranged from 2x to 4x. This draft ratio produced a standard elastic circular knit fabric which ranged in weight from 7–11 oz./sq. yd. (248–389 cm$^3$/mm$^2$) with a fabric count of 35–46 wales per inch (13.8–18.1 wales/cm) and 50–81 courses per inch (19.7–31.9 courses/cm), and percent elastic from 8–18%. The elastic fibers were then covered with polyester textured filament using an industry standard yarn covering device. The yarn was used as the filling yarn on a Jaquard rapier loom with a cotton warp. This produced a 5% elastic 2x1 twill bottom weight fabric with elasticity in the weft direction.

In practice, fabrics are heat-set for two reasons: (1) to stabilize the non-elastic yarns to prevent shrinking; and (2) to modify the elastic power or stretch of the fabric. In heat setting, the fabric is held under tension and passed through a tenter frame, wherein heat is applied across a range of temperatures for different fibers. For example, 100% polyester fibers are typically heat set at 210° C. for 1 minute to stabilize the fabric. Because of the limited service temperature of Spandex, a polyester/spandex blend fabric would have to be heat set at lower temperatures (for example, 182–196° C.). Consequentially, polyester/spandex blend fabric is typically not fully stabilized and often shrinks. Conversely, in this evaluation, Inventive Example 12 exhibited a high service temperature that permitted full heat setting of the polyester. The heat-setting studies were conducted at 210° C. for 1 minute on polyester/Inventive Example 12 knitted fabrics (Inventive Example 13). This inventive blend fabric retained its elasticity and did not shrink in further processing. After heat setting, Inventive Example 12 fibers were removed from one sample of the blend fabric and analyzed by optical microscopy. Under 40× magnification, the heat set Inventive Example fibers showed no damage due to heat exposure and maintained mechanical properties. Under the same conditions, ethylene polymer elastic fibers that were E-beam irradiated in air with amine stabilization appeared broken at 40× magnification.

In a dyeing evaluation, once heat set, polyester/inventive Example 12 knitted fabrics were exposed to a range of dyeing conditions to evaluate dyeability performance. Three different industry standard dyeing conditions were used in this evaluation which consisted of high pressure dispersed dyeing of polyester, acid dyeing of nylon, and reactive dyeing of cotton. The most rigorous conditions was the dispersed dyeing of polyester wherein temperatures ranged from 60° C. to 130° C. and reagents included soda ash, caustic soda, surfactant, dispersed dye, antifoaming agents and acetic acid for pH balancing. After dyeing and finishing, the Inventive Example 13 retained its elasticity and exhibited uniform coloration. The Inventive Example 12 fibers buried in the fabric structure did not accept dye or stain which is unlike Spandex which stains during dyeing processing and consequentially must be repeatedly rinsed to remove the stain to prevent bleeding and crocking in consumer use and washing. The Inventive Example 12 fibers were removed from the fabric and analyzed by optical microscopy. Like the Inventive fibers after heat setting, these showed no damage due to the dyes or exposure to the other chemical reagents and maintained their mechanical properties. After being subjected to the same dyeing conditions, under 40× magnification, the ethylene polymer fibers that were E-beam under air with amine stabilization were indented and/or stuck to PET fibers.

In another evaluation, the effect of e-beam irradiation under nitrogen and amine stabilization was investigated for fibers comprising a substantially hydrogenated block polymer. The block polymer was characterized as having a molecular weight (Mw) of 63,000; a polydispersity of about 1.0, containing 32% by weight styrene before hydrogenation and 40% by weight 1,2 addition. In this evaluation, Control 6 and Inventive Examples 14–16 were all E-beam irradiated at 10° C. and all samples, Control 5, Control 6 and Examples 14–16, contained 1700 ppm of Irganox-1010 (a hindered phenolic stabilizer) and 2000 ppm of Chimassorb 944 (a hindered amine stabilizer). Table 3 shows the results of the simulated heat setting and dyeing tests.

TABLE 3

Effect of E-beam Irradiation Conditions on Heat Resistance of Substantially Hydrogenated Block Polymer (SHBP).

| Sample | Radiation Mrad | Gel, wt. % (xylene) | Stick Test at 130° C. for 30 min | Fiber Break Time (min) |
|---|---|---|---|---|
| Control 5 | 0 | 0 | stuck | 0.3 |
| Control 6 | 25.6, air | 35.9 | stuck | N/D |
| Example 14 | 22.4, N$_2$ | 53.7 | slightly stuck | 10 |
| Example 15 | 25.6, N$_2$ | 67.7 | none | 12 |
| Example 16 | 28.8, N$_2$ | 74.3 | none | 13 |

N/D: not determines because the sample either melted or was stuck together at 200° C.

The results in Table 3 show that the SHBP samples that were E-beam irradiated under nitrogen and were stabilized with an amine/phenolic combination (Inventive Examples 14–16) exhibited improved heat resistance and passed the simulated dyeing and heat setting tests.

We claim:

1. A method of making an elastic article having improved heat resistance comprising the steps of
   (a) providing at least one elastic polymer or elastic polymer composition which contains at least one amine or nitrogen-containing stabilizer therein,
   (b) fabricating, forming or shaping the polymer or polymer composition into an article, and
   (c) during or after the fabrication, forming or shaping, subjecting the article to ionizing radiation while the article is in or under an inert or oxygen-reduced atmosphere wherein the elastic polymer is or the elastic polymer composition comprises at least one hydrogenated block polymer; wherein the hydrogenated block polymer is a substantially hydrogenated block polymer characterized as having:
      i) a weight ratio of conjugated diene monomer unit to vinyl aromatic monomer unit before hydrogenation of greater than or equal to 60:40;
      ii) a weight average molecular weight ($M_w$) before hydrogenation of from 30,000 to 150,000, wherein each vinyl aromatic monomer unit (a) has a weight average molecular weight, $Mw_a$, of from about 5,000 to about 45,000 and each conjugated diene monomer unit (b) bas a weight average molecular weight, $Mw_b$, of from about 12,000 to about 110,000; and
      iii) a hydrogenation level such that each vinyl aromatic monomer unit block is hydrogenated to a level of greater than 90 percent and each conjugated diene monomer unit block is hydrogenated to a level of greater than 95 percent, as determined, using UV-VIS spectrophotometry and proton NMR analysis.

2. A method of making an elastic article having improved heat resistance comprising the steps of:
(a) providing at least one hydrogenated block polymer,
(b) fabricating, forming or shaping the block polymer into an article, and
(c) during or after the fabrication, forming or shaping, subjecting the article to ionizing radiation while the article is in or under an inert atmosphere wherein the hydrogenated block polymer is a substantially hydrogenated block polymer characterized as having:
  i) a weight ratio of conjugated diene monomer unit to vinyl aromatic monomer unit before hydrogenation of greater than or equal to 60:40;
  ii) a weight average molecular weight ($M_w$) before hydrogenation of from 30,000 to 150,000, wherein each vinyl aromatic monomer unit (a) has a weight average molecular weight, $Mw_a$, of from about 5,000 to about 45,000 and each conjugated diene monomer unit (b) has a weight average molecular weight $Mw_b$, of from about 12,000 to about 110,000; and
  iii) a hydrogenation level such that each vinyl aromatic monomer unit block is hydrogenated to a level of greater than 90 percent and each conjugated diene monomer unit block is hydrogenated to a level of greater than 95 percent, as determined using UV-VIS spectrophotometry and proton NMR analysis.

3. The method of claim 2, wherein the at least one hydrogenated block polymer contains at least one phenol or phosphite stabilizer.

* * * * *